US012567951B2

(12) United States Patent
Iyer et al.

(10) Patent No.: US 12,567,951 B2
(45) Date of Patent: Mar. 3, 2026

(54) USING SECURED KEY MANAGEMENT WITH SYSTEM CONTROL PROCESSORS FOR MULTI-TENANCY AND BACKEND SECURED STORAGE DEVICES

(71) Applicant: Dell Products L.P., Round Rock, TX (US)

(72) Inventors: Shyamkumar Iyer, Cedar Park, TX (US); Abhay Salunke, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 167 days.

(21) Appl. No.: 18/461,137

(22) Filed: Sep. 5, 2023

(65) Prior Publication Data

US 2025/0080331 A1 Mar. 6, 2025

(51) Int. Cl.
*H04L 29/06* (2006.01)
*H04L 9/08* (2006.01)
(52) U.S. Cl.
CPC .......... *H04L 9/0825* (2013.01); *H04L 9/0866* (2013.01); *H04L 9/0894* (2013.01)

(58) Field of Classification Search
CPC ... H04L 9/0825; H04L 9/0866; H04L 9/0894; G06F 21/53
See application file for complete search history.

(56) References Cited

U.S. PATENT DOCUMENTS

2014/0050317 A1* 2/2014 Sabin .................... H04L 9/0894
                                                    380/44
2019/0266103 A1* 8/2019 Pearson ................ H04L 9/0897
2022/0103349 A1* 3/2022 Tsirkin .................... G06F 21/53

* cited by examiner

*Primary Examiner* — Yogesh Paliwal
(74) *Attorney, Agent, or Firm* — Chamberlain, Hrdlicka, White, Williams & Aughtry; Aly Z. Dossa

(57) ABSTRACT

A system control processor manager is programmed to obtain a configuration request for a trusted execution environment (TEE) associated with a tenant. In response to receiving the configuration request, the system control processor manager may generate the TEE associated with the tenant, communicate with a key management system (KMS) to obtain a set of keys associated with the tenant, store the set of keys in the TEE, and configure a set of secured storage devices associated with the tenant with the set of keys. The system control processor may service multiple configuration requests associated with multiple tenants.

20 Claims, 10 Drawing Sheets

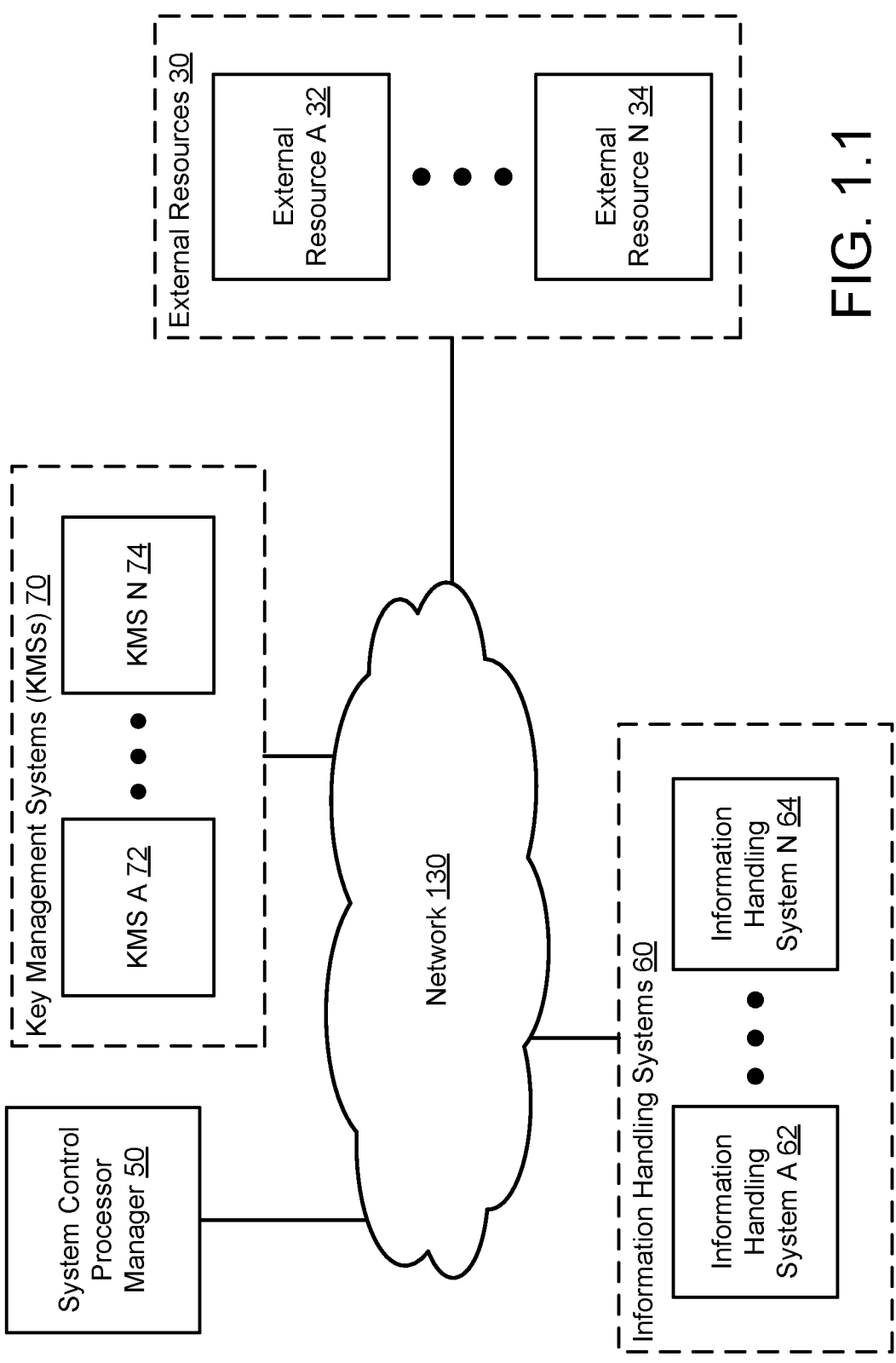
FIG. 1.1

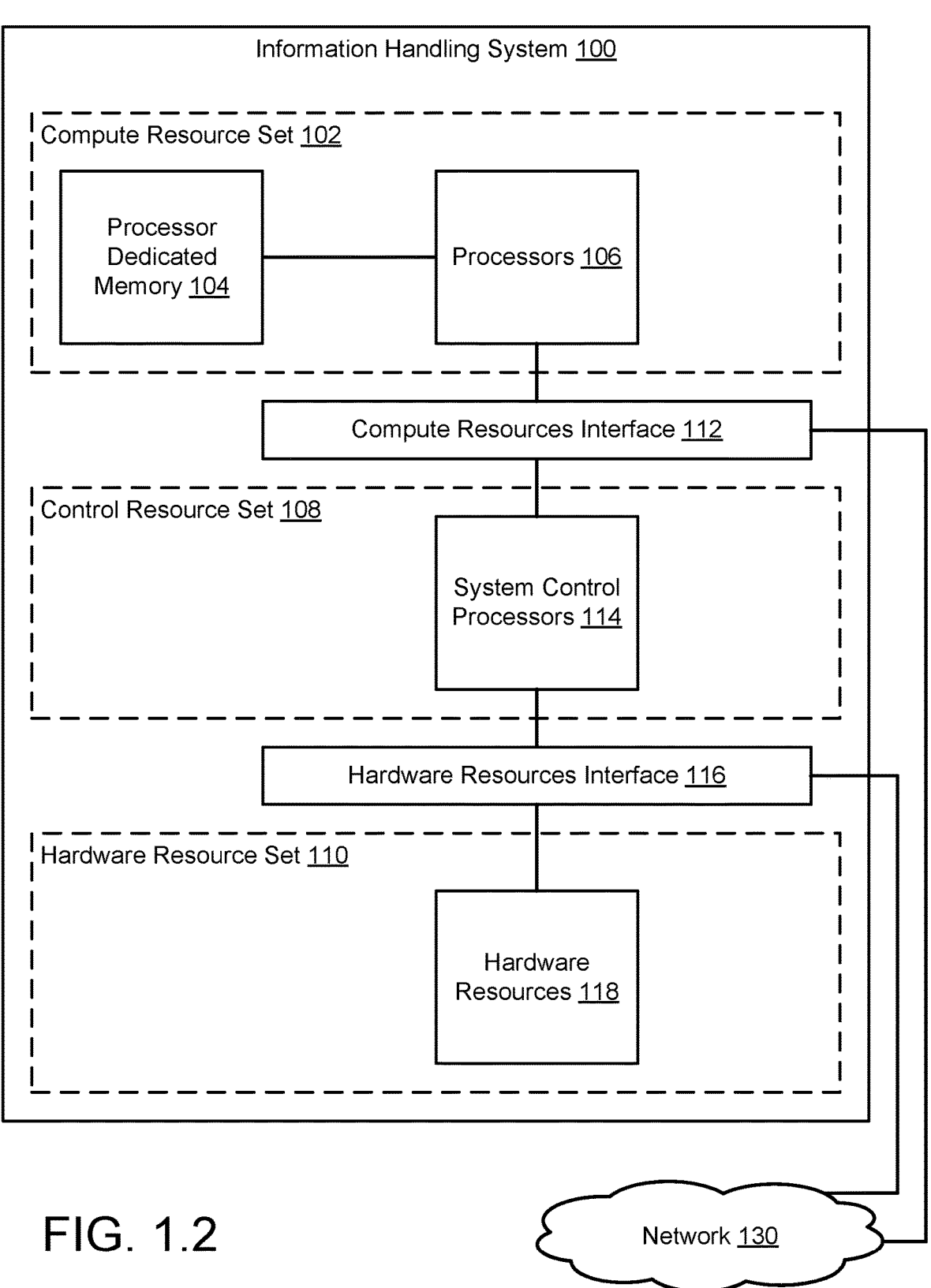
FIG. 1.2

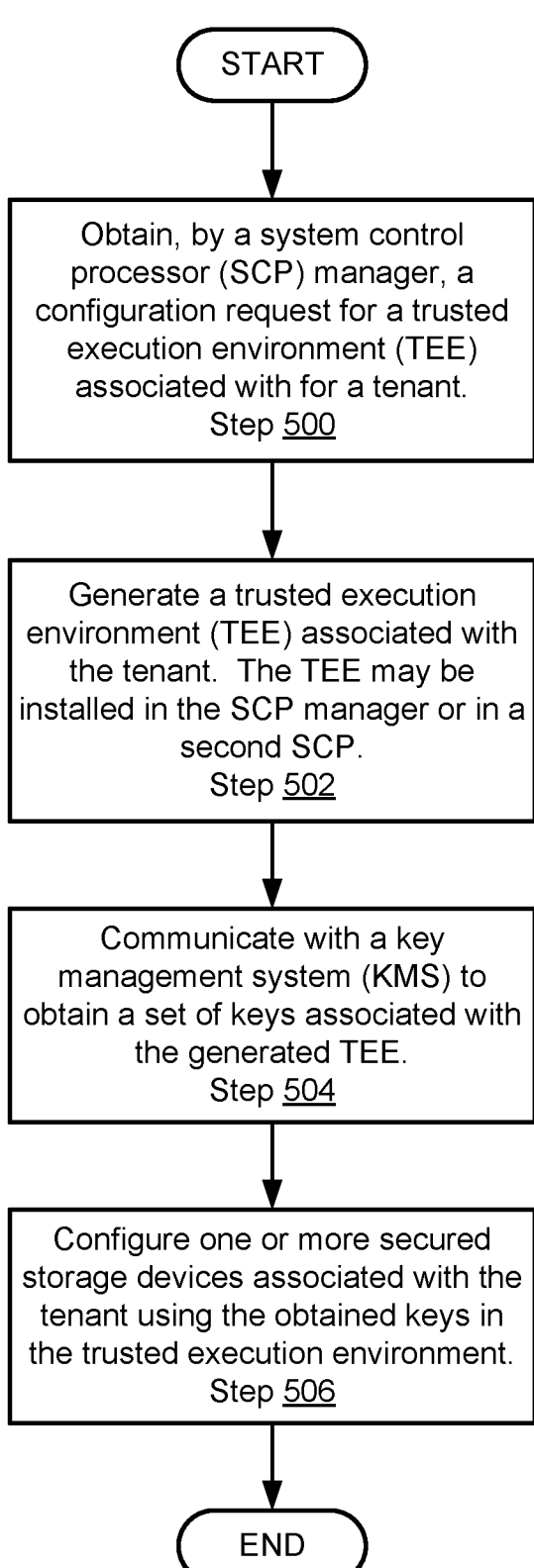

START

Obtain, by a system control processor (SCP) manager, a configuration request for a trusted execution environment (TEE) associated with for a tenant.
Step 500

Generate a trusted execution environment (TEE) associated with the tenant.  The TEE may be installed in the SCP manager or in a second SCP.
Step 502

Communicate with a key management system (KMS) to obtain a set of keys associated with the generated TEE.
Step 504

Configure one or more secured storage devices associated with the tenant using the obtained keys in the trusted execution environment.
Step 506

END

Output
Device
908

Non-Persistent
Storage
904

Processor(s)
902

Persistent Storage
906

Communication
Interface
912

Input Device
910

USING SECURED KEY MANAGEMENT WITH SYSTEM CONTROL PROCESSORS FOR MULTI-TENANCY AND BACKEND SECURED STORAGE DEVICES

BACKGROUND

Computing devices may provide services. To provide the services, the computing devices may include hardware components and software components. The services provided by the computing devices may be limited by these components.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

FIG. 1.1 shows a diagram of a system in accordance with one or more embodiments of the invention.

FIG. 1.2 shows a diagram of an information handling system in accordance with one or more embodiments of the invention.

FIG. 5 shows a flowchart of a method of brokering key management using a trusted execution environment in accordance with one or more embodiments of the invention.

DETAILED DESCRIPTION

Figure 2:
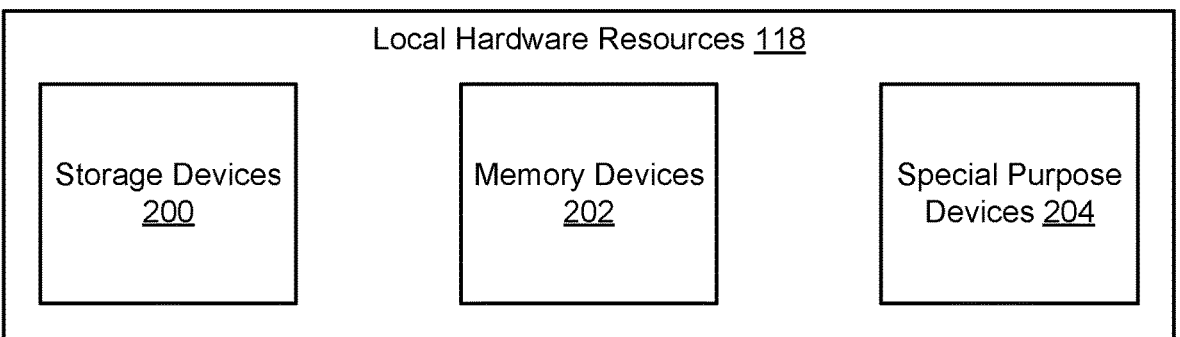
FIG. 2 shows a diagram of local hardware resources in accordance with one or more embodiments of the invention.

Specific embodiments will now be described with reference to the accompanying figures. In the following description, numerous details are set forth as examples of the invention. It will be understood by those skilled in the art that one or more embodiments of the present invention may be practiced without these specific details and that numerous variations or modifications may be possible without departing from the scope of the invention. Certain details known to those of ordinary skill in the art are omitted to avoid obscuring the description.

In the following description of the figures, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

Throughout this application, elements of figures may be labeled as A to N. As used herein, the aforementioned labeling means that the element may include any number of items and does not require that the element include the same number of elements as any other item labeled as A to N. For example, a data structure may include a first element labeled as A and a second element labeled as N. This labeling convention means that the data structure may include any number of the elements. A second data structure, also labeled as A to N, may also include any number of elements. The number of elements of the first data structure and the number of elements of the second data structure may be the same or different.

In general, embodiments of the invention relate to systems, devices, and methods for providing computer implemented services. To provide computer implemented services, computing resources may need to be allocated for the performance of the services. The services may include, for example, processing resources, memory, resources, storage resources, computing resources, etc.

To allocate the computing resources, logically composed systems (LCSs) may be instantiated. A LCS may be a logical device (the components of which may be distributed across one or more information handling systems) that has exclusive use over a quantity of computing resources. Computing resources from multiple information handling systems may be allocated to a LCS thereby enabling a LCS to utilize computing resources from any number of information handling systems for performance of corresponding computer implemented services.

To allocate computing resources, the system may include a system control processor manager. The system control processor manager may obtain composition requests. The composition requests may indicate an operational instances requirement. The operational instances requirement may specify a minimum number of instances of the resources required to satisfy the desired operation of the LCS. Further, the operational instances requirement may specify a maximum number of instances of the resources that may be allocated to the LCS.

Once the quantities of computing resources are obtained, the system control processor manager may allocate resources of the information handling system to initially meet the minimum number of instances of the resources by instructing system control processors of the information handling systems to prepare and present hardware resource sets of the information handling system to compute resource sets of the information handling systems.

After a LCS is instantiated, the use (e.g., such as the rate of use, the total quantity of use, or other statistical characterization of the utilization of a resource by a client) of the computing resources allocated to the LCS may be monitored to obtain a resource use state of the LCS. As the resource use state indicates additional resources are needed, the system control processor may allocate additional resources to the LCS up to a maximum number of instances of the resources as specified in the operation instances requirement.

Once the quantities of computing resources are obtained, the system control processor manager may allocate resources of the information handling system to meet the identified quantities of computing resources by instructing system control processors of the information handling systems to prepare and present hardware resource sets of the information handling system to compute resource sets of the information handling systems.

Each LCS may be associated with a tenant. The tenant may be an entity such as, e.g., a user, that initiates and/or operates one of the instantiated LCSs. A system of one or more information handling systems may instantiate multiple LCSs associated with multiple tenants. Each tenant may be independent of each other and may not desire to allow access to its data and/or resources to other tenants operating LCSs in the system.

To manage the separation of resources and to reduce undesired access by the other tenant, each tenant may utilize the functionality of a trusted execution environment (TEE) for data security services. A TEE may be an environment that securely stores sensitive information (e.g., security keys). The sensitive information may be used to encrypt and/or decrypt storage devices associated with a corresponding tenant and/or LCS (further discussed below). Further, the sensitive information may be used to verify the identity of each LCS (further discussed below). The TEE may be provided by the system control processor manager and/or any other system control processors in the information handling systems. Each TEE may be associated with a tenant. Further, each TEE may store sensitive information for one or more LCSs of one corresponding tenant. In this manner, each TEE stores secured information only available for the corresponding tenant, and LCSs of other tenants are less able to, even if unintentionally, access the resources of other tenants.

FIG. 1.1 shows a system in accordance with one or more embodiments of the invention. The system may include a system control processor manager (50), any number of key management systems (KMSs) (70), and any number of information handling systems (60). The information handling systems (60) may provide computer implemented services. The computer implemented services may include, for example, database services, data storage services, electronic communications services, data protection services, and/or other types of services that may be implemented using information handling systems.

The information handling system of the system of FIG. 1.1 may operate independently and/or cooperatively to provide the computer implemented services. For example, a single information handling system (e.g., 62) may provide a computer implemented service on its own (i.e., independently) while multiple other information handling systems (e.g., 62, 64) may provide a second computer implemented service cooperatively (e.g., each of the multiple other information handling systems may provide similar and or different services that form the cooperatively provided service).

To provide computer implemented services, the information handling systems (60) may utilize computing resources provided by hardware devices. The computing resources may include, for example, processing resources, storage resources, memory resources, graphics processing resources, communications resources, and/or other types of resources provided by the hardware devices. Various hardware devices may provide these computing resources.

The type and quantity of computing resources required to provide computer implemented services may vary depending on the type and quantity of computer implemented services to be provided. For example, some types of computer implemented services may be more compute intensive (e.g., modeling) while other computer implemented services may be more storage intensive (e.g., database) thereby having different computing resource requirements for these different services. Consequently, computing resources may be used inefficiently if the quantity of computing resources is over-allocated for the computer implemented services. Similarly, the quality of the provided computer implemented services may be poor or otherwise undesirable if computing resources are under-allocated for the computer implemented services.

In general, embodiments of the invention relate to system, methods, and devices for managing the hardware resources of the information handling systems (60) and/or other resources (e.g., external resources (30)) to provide computer implemented services. The hardware resources of the information handling systems (60) may be managed by instantiating one or more LCSs using the hardware resources of the information handling systems (60), external resources (30), and/or other types of hardware devices operably connected to the information handling systems (60). Consequently, the computing resources allocated to a LCS may be tailored to the specific needs of the services that will be provided by the LCS.

In one or more embodiments of the invention, the system includes a system control processor manager (50). The system control processor manager (50) may provide LCS composition services. LCS composition services may include (i) obtaining composition requests for LCSs and (ii) aggregating computing resources from the information handling systems (60) and/or external resources (30) using system control processors to service the composition requests by instantiating LCSs in accordance with the requests. By doing so, instantiated LCSs may provide computer implemented services in accordance with the composition requests.

When a LCS is instantiated, it may be at the request of one of the clients (not shown). To determine the utilization of the computing resources of the information handling systems (60), the system control processor manager (50) may instruct the system control processors to monitor the use of hardware resources by the clients. This information may be used, for example, to ascertain whether additional or fewer resources should be allocated to the LCSs, to identify how LCSs should be instantiated (e.g., to identify the minimum necessary computing resources to provide requested computer implemented services), or to notify and/or bill the clients for their respective uses of the information handling systems (60) due to their use of the LCSs.

In one or more embodiments of the invention, the system control processor manager (50) instantiates LCSs in accordance with a three-resource set model. As will be discussed in greater detail below, the computing resources of an information handling system may be divided into three logical resource sets: a compute resource set, a control resource set, and a hardware resource set. Different resource sets, or portions thereof, from the same or different information handling systems may be aggregated (e.g., caused to operate as a computing device) to instantiate a LCS having at least one resource set from each set of the three-resource set model.

By logically dividing the computing resources of an information handling system into these resource sets, different quantities and types of computing resources may be allocated to each LCS thereby enabling the resources allocated to the respective information handling system to match performed workloads. Further, dividing the computing resources in accordance with the three-resource set model may enable different resource sets to be differentiated (e.g., given different personalities) to provide different function-alities. Consequently, LCSs may be composed on the basis of desired functionalities rather than just on the basis of aggregate resources to be included in the LCS.

Additionally, by composing LCSs in this manner, the control resource set of each LCS may be used to consistently deploy management services across any number of LCSs. Consequently, embodiments of the invention may provide a framework for unified security, manageability, resource management/composability, workload management, and distributed system management by use of this three-resource set model. For additional details regarding the system control processor manager (50), refer to FIG. 4.

In one or more embodiments of the invention, a LCS is a device that is formed using all, or a portion, of the comput-ing resources of the information handling systems (60), the external resources (30), and/or other types of hardware devices operably connected to the information handling systems (60). The LCS may utilize the computing resources allocated to it to provide computer implemented services. For example, the LCS may host one or more applications that utilize the computing resources assigned to the LCS. The applications may provide the computer implemented services.

To instantiate LCSs, the information handling systems (60) may include at least three resource sets including a control resource set. The control resource set may include a system control processor. The system control processor of each information handling system may coordinate with the system control processor manager (50) to enable LCSs to be instantiated. For example, the system control processor of an information handling system may provide telemetry data regarding the computing resources of an information han-dling system, may perform actions on behalf of the system control processor manager (50) to aggregate computing resources together, may monitor the utilization of computing resources by the clients, and/or may provide services that unify the operation of LCSs.

In one or more embodiments of the invention, compute resource sets of LCSs are presented with bare metal resources by control resource sets even when the presented resources are actually being managed using one or more layers of abstraction, emulation, virtualization, security model, etc. For example, the system control processors of the control resource sets may provide the abstraction, emu-lation, virtualization, and/or other services while presenting the resources as bare metal resources. Consequently, these services may be transparent to applications hosted by the compute resource sets of LCSs thereby enabling uniform deployment of such services without requiring implemen-tation of control plane entities hosted by the compute resource sets of the LCSs. Accordingly, by utilizing system control processors to monitor the use of the computing resources of a LCS, applications or other entities hosted by the LCS may not be able to view, be aware, impact, or otherwise influence the collection of computing resource use data. For additional details regarding the information han-dling systems (60), refer to FIG. 1.2.

The external resources (30) may provide computing resources that may be allocated for use by LCSs. For example, the external resources (30) may include hardware devices that provide any number and type of computing resources. The LCS may use these resources to provide their functionalities. For example, system control processors may operably connect to and manage the external resources (30) to provide additional and/or different computing resources from those available to be provided only using hardware resource sets of information handling systems. By utilizing system control processors to manage these resources, the use of these external resources (30) by the clients may also be efficiently and transparently monitored.

Different external resources (e.g., 32, 34) may provide similar or different computing resources. For example, some external resources may include large numbers of hard disk drives to provide storage resources while others may include a graphics processing unit rendering farms. The external resources (30) may include any number and type of com-puting resources for allocation to LCSs via system control processors of control resource sets.

The system of FIG. 1.1 may include any number of information handling systems (e.g., 62, 64), any number of external resources (e.g., 32, 34), and any number of system control processor managers (e.g., 50). Any of the compo-nents of FIG. 1.1 may be operably connected to any other component and/or other components not illustrated in FIG. 1.1 via one or more networks (e.g., 130). The networks may be implemented using any combination of wired and/or wireless network topologies.

The clients, system control processor manager (50), infor-mation handling systems (60), and/or external resources (30) may be implemented using computing devices. The com-puting devices may include, for example, a server, laptop computer, a desktop computer, a node of a distributed system, etc. The computing device may include one or more processors, memory (e.g., random access memory), and/or persistent storage (e.g., disk drives, solid-state drives, etc.). The persistent storage may store computer instructions, e.g., computer code, that (when executed by the processor(s) of the computing device) cause the computing device to per-form the functions of the system control processor manager (50), information handling systems (60), and/or external resources (30) described in this application and/or all, or a portion, of the methods illustrated in FIG. 5. The clients, system control processor manager (50), information han-dling systems (60), and/or external resources (30) may be implemented using other types of computing devices with-out departing from the invention. For additional details regarding computing devices, refer to FIG. 9.

In one or more embodiments, the key management sys-tems (KMSs) (60) are entities that provide key management services to one or more tenants. The key management services may include the secured storage of keys (e.g., security keys) to be used by the tenants for security services such as, for example, encryption of data. Each KMS (72, 74) may be associated with a tenant. The system control pro-cessor manager (50) may communicate with the KMSs (70) to broker the storage of sensitive information such as, e.g., security keys for securing resources in the LCSs. The security keys may be obtained in accordance with, e.g., FIG. 5.

In one or more embodiments, each KMS (72, 74) is implemented using a hardware device including circuitry. The hardware device may be, for example, a digital signal processor, a field programmable gate array, or an applica-tion-specific integrated circuit. The circuitry may be adapted to cause the hardware device to perform the functionality of the KMS (72, 74). A KMS (72, 74) may be implemented using other types of hardware devices without departing from the invention.

In one or more embodiments of the invention, the KMS (72, 74) is implemented using a processor adapted to execute computing code stored on a persistent storage that when executed by the processor performs the functionality of the KMS (72, 74). The processor may be a hardware processor including circuitry such as, for example, a central processing unit or a microcontroller. The processor may be other types of hardware devices for processing digital information without departing from the invention.

While the information handling system (60) has been illustrated and described as including a limited number of specific components, an information handling system in accordance with embodiments of the invention may include additional, fewer, and/or different components without departing from the invention.

Turning to FIG. 1.2. FIG. 1.2 shows a diagram of an information handling system (100) in accordance with one or more embodiments of the invention. Any of the information handling systems (e.g., 60) of FIG. 1.1 may be similar to the information handling system (100) illustrated in FIG. 1.2.

As discussed above, the information handling system (100) may provide any quantity and type of computer implemented services. To provide the computer implemented services, resources of the information handling system may be used to instantiate one or more LCSs. The LCSs may provide the computer implemented services.

To provide computer implemented services, the information handling system (100) may include any number and type of hardware devices including, for example, one or more processors (106), any quantity and type of processor dedicated memory (104), one or more system control processors (114), and any number of hardware resources (118). These hardware devices may be logically divided into three resource sets, including a compute resource set (102), a control resource set (108), and a hardware resource set (110).

The control resource set (108) of the information handling system (100) may facilitate formation of LCSs. To do so, the control resource set (108) may prepare any quantity of resources from any number of hardware resource sets (e.g., 110) (e.g., of the information handling system (100) and/or other information handling systems) for presentation to processing resources of any number of computing resource sets (e.g., 102) (e.g., of the information handling system (100) and/or other information handling systems). Once prepared, the control resource set (108) may present the prepared resources as bare metal resources to the processors (e.g., 106) of the allocated computing resources. By doing so, a LCS may be instantiated.

To prepare the resources of the hardware resource sets for presentation, the control resource set (108) may employ, for example, virtualization, indirection, abstraction, and/or emulation. These management functionalities may be transparent to applications hosted by the resulting instantiated LCSs. Consequently, while unknown to the control plane entities of the LCS, the LCS may operate in accordance with any number of management models, thereby providing for unified control and management of LCSs. These functionalities may be transparent to applications hosted by LCSs, thereby relieving them from overhead associated with these functionalities.

For example, consider a scenario where a compute resource set is instructed to instantiate a LCS including a compute resource set and a hardware resource set that will contribute storage resources to the compute resource set. The compute resource set may virtualize the storage resources of the hardware resource set to enable a select quantity of the storage resources to be allocated to the LCS while reserving some of the storage resources for allocation to other LCSs. However, the prepared storage resources may be presented to the compute resource set as bare metal resources. Consequently, the compute resource set may not need to host any control plane entities or otherwise incur overhead for utilizing the virtualized storage resources.

The control resource set (108) may also enable the utilization of any of the hardware components of the information handling system (100) by respective clients. When a LCS is instantiated, it (and its hardware devices) may be utilized by a client. For example, the client may cause the LCS to execute applications on the compute resource set (102) which, in turn, may utilize any number of hardware resource sets (e.g., 110) as part of their execution.

Because the control resource set (108) may mediate utilization of hardware resource sets (110) by compute resource sets (102), the control resource set (108) may transparently ascertain the use of the hardware devices of these resource sets. To do so, the control resource set (108) may intercept (as part of presenting computing resources of hardware resource sets to compute resource sets) communications between resource sets, monitor workloads being performed by each of the respective resource sets, monitor power utilization by these resource sets, and/or may perform other actions to identify the use of these hardware devices by respective clients.

The collective use information may be used, for example, to ascertain whether additional resources should be added to LCSs, to ascertain whether resources should be removed from LCSs, to notify clients of their use of these resources (e.g., if the clients are being billed for use as part of a pay for use infrastructure deployment), to obtain information useable to estimate future computing resource requirements for hosting various applications and/or performing various types of workloads, and/or for other purposes.

The compute resource set (102) may include one or more processors (106) operably connected to the processor dedicated memory (104). Consequently, the compute resource set (102) may host any number of executing processes thereby enabling any number and type of workload to be performed. When performing the workloads, the compute resource set (102) may utilize computing resources provided by the hardware resource set (110) of the information handling system (100), hardware resource sets of other information handling systems, and/or external resources.

The processors (106) of the compute resource set (102) may be operably connected to one or more system control processors (114) of the control resource set (108). For example, the processors (106) may be connected to a compute resource interface (112), which is also connected to the system control processors (114). The compute resource interface (112) may enable the processors (106) to communicate with other entities via bare metal communications. Also, the compute resources interface (112) may enable system control processors (114) of the control resource set (108) to monitor the activity of the processors (106) and/or processor dedicated memory (104) to identify use of these hardware devices by clients.

The system control processors (114) of the control resource set (108) may present computing resources to the processors (106) as bare metal resources. In other words, from the point of view of the processors (106), any number of bare metal resources may be operably connected to it via the compute resources interface (112) when, in reality, the system control processors (114) are operably connected to the processors (106) via the compute resources interface (112). In other words, the system control processors (114) may manage presentation of other types of resources to the compute resource set (102).

By presenting the computing resources to the processors as bare metal resources, control plane entities (e.g., applications) such as hypervisors, emulators, and/or other types of management entities may not need to be hosted (e.g., executed) by the processors (106) for the processors (106) and entities hosted by them to utilize the computing resources allocated to a LCS. Accordingly, all of the processing resources provided by the compute resource set (102) may be dedicated to providing the computer implemented services.

For example, the processors (106) may utilize mapped memory addresses to communicate with the bare metal resources presented by the system control processors (114) to the processors (106). The system control processors (114) may obtain these communications and appropriately remap (e.g., repackage, redirect, encapsulate, etc.) the communications to the actual hardware devices providing the computing resources, which the processors (106) are interacting with via the compute resources interface (112) and/or hardware resources interface (116), discussed below. Consequently, indirection, remapping, and/or other functions required for resource virtualization, emulation, abstraction, or other methods of resource allocation (other than bare metal) and management may not need to be implemented via the processors (106).

By doing so, any number of functions for a LCS may be automatically performed in a manner that is transparent to the control plane. Accordingly, a LCS may operate in a manner consistent with a unified, consistent architecture or model (e.g., communications model, data storage model, etc.) by configuring the operation of one or more system control processors in a manner consistent with the architecture or model.

In one or more embodiments of the invention, control plane entities utilize computing resources presented through one or more layers of indirection, abstraction, virtualization, etc. In other words, an indirect user of hardware devices and computing resources provided thereby.

In one or more embodiments of the invention, data plane entities directly utilize computing resources. For example, data plane entities may instruct hardware devices on their operation thereby directly utilizing computing resources provided thereby. Data plane entities may present the computing resources to control plane entities using one or more layers of indirection, abstraction, virtualization, etc.

The system control processors (114) may present any number of resources operably connected to it (e.g., the hardware resource set (110), other resources operably connected to it via an interface (e.g., hardware resources interface (116), etc.) as bare metal resources to the processors (106) of the compute resource set (102). Consequently, the system control processors (114) may implement device discovery processes compatible with the processors (106) to enable the processors (106) to utilize the presented computing resources.

For example, the hardware resource set (110) may include hardware resources (118) operably connected to the system control processors (114) via a hardware resources interface (116). The hardware resources (118) may include any number and type of hardware devices that provide computing resources. For additional details regarding the hardware resources (118), refer to FIG. 2.

In another example, the system control processors (114) may be operably connected to other hardware resource sets of other information handling systems via hardware resources interface (116), network (130), and/or other system control processors of the other information handling systems. The system control processors may cooperatively enable hardware resource sets of other information handling systems to be prepared and presented as bare metal resources to the compute resource set (102).

In an additional example, the system control processors (114) may be operably connected to external resources via hardware resources interface (116) and network (130). The system control processors (114) may prepare and present the external resources as bare metal resources to the compute resource set (102).

The system control processors (114), by presenting resources to the compute resource set (102), may be able to monitor the utilization of the presented resources in a manner that is transparent to the applications or other entities executing using the processors (106). Consequently, these entities may not be able to interfere with monitoring of the use of these resources. In contrast, if an agent or other entity for monitoring computing resource use rates is executing using the processors (106), other entities executing using the processors (106) may be able to interfere with the operation of the monitoring entity. Accordingly, embodiments of the invention may provide a method of monitoring computing resources use that is less susceptible to interference by other entities.

Figure 3:
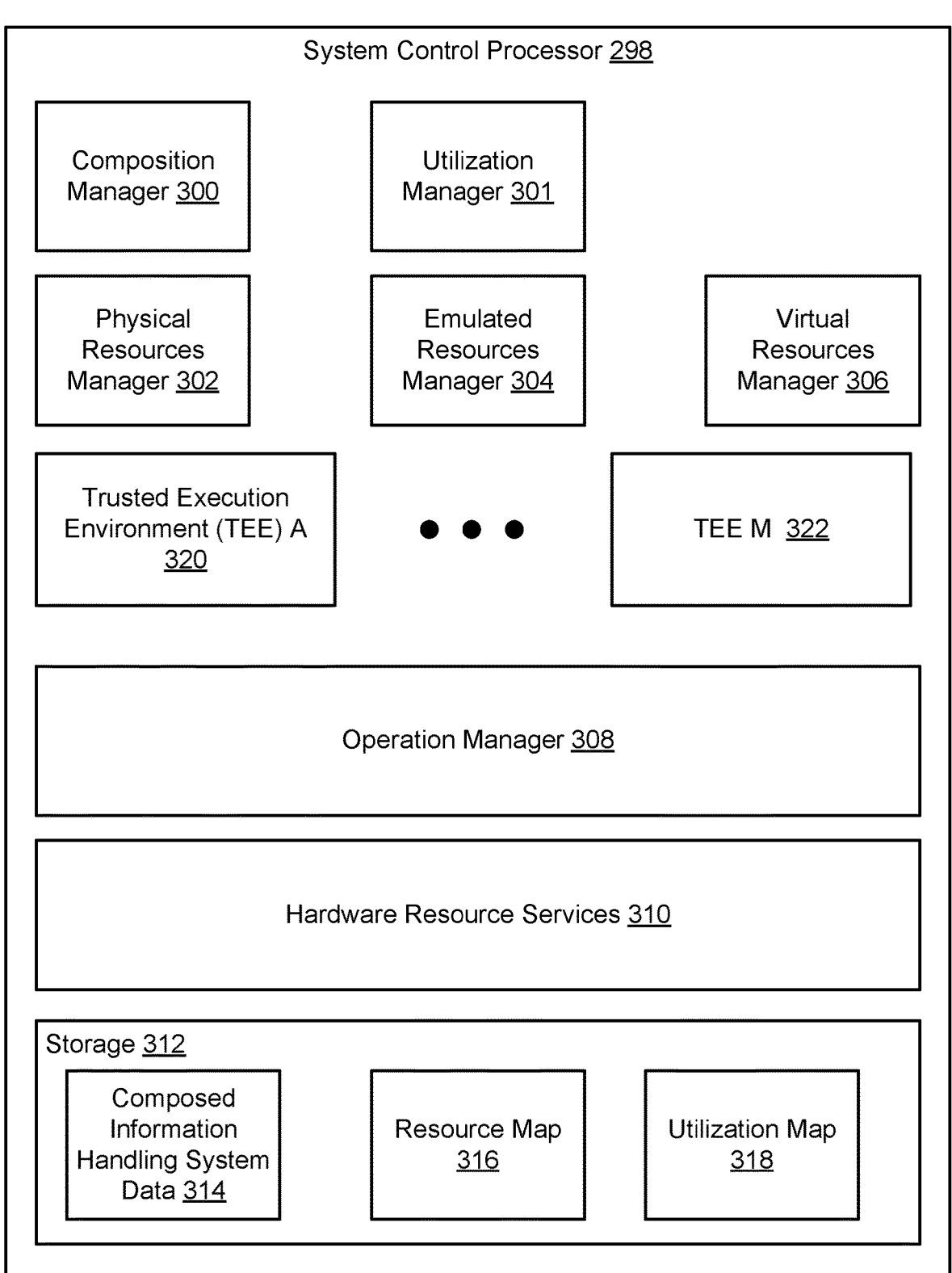
FIG. 3 shows a diagram of a system control processor in accordance with one or more embodiments of the invention.

For additional details regarding the operation and functions of the system control processors (114), refer to FIG. 3.

The compute resources interface (112) may be implemented using any suitable interconnection technology including, for example, system buses such as compute express links or other interconnection protocols. The compute resources interface (112) may support any input/output (IO) protocol, any memory protocol, any coherence interface, etc. The compute resources interface (112) may support processor to device connections, processor to memory connections, and/or other types of connections. The compute resources interface (112) may be implemented using one or more hardware devices including circuitry adapted to provide the functionality of the compute resources interface (112).

The hardware resources interface (116) may be implemented using any suitable interconnection technology including, for example, system buses such as compute express links or other interconnection protocols. The hardware resources interface (116) may support any input/output (IO) protocol, any memory protocol, any coherence interface, etc. The hardware resources interface (116) may support processor to device connections, processor to memory connections, and/or other types of connections. The hardware resources interface (116) may be implemented using one or more hardware devices including circuitry adapted to provide the functionality of the hardware resources interface (116).

In some embodiments of the invention, the compute resource set (102), control resource set (108), and/or hardware resource set (110) may be implemented as separate physical devices. In such a scenario, the compute resources interface (112) and hardware resources interface (116) may include one or more networks enabling these resource sets to communicate with one another. Consequently, any of these resource sets (e.g., 102, 108, 110) may include network interface cards or other devices to enable the hardware devices of the respective resource sets to communicate with each other.

In one or more embodiments of the invention, the system control processors (114) support multiple, independent connections. For example, the system control processors (114) may support a first network communications connection (e.g., an in-band connection) that may be allocated for use by applications hosted by the processors (106). The system control processors (114) may also support a second network communications connection (e.g., an out-of-band connection) that may be allocated for use by applications hosted by the system control processors (114). The out-of-band connection may be utilized for management and control purposes while the in-band connection may be utilized to provide computer implemented services. These connections may be associated with different network endpoints thereby enabling communications to be selectively directed toward applications hosted by the processors (106) and/or system control processors (114). As will be discussed in greater detail with respect to FIG. 3, the system control processors (114) may utilize the out-of-band connections to communicate with other devices to manage (e.g., instantiate, monitor, modify, etc.) LCSs. The network (130) may correspond to any type of network and may be operably connected to the Internet or other networks thereby enabling the information handling system (100) to communicate with any number and type of other devices.

The information handling system (100) may be implemented using computing devices. The computing devices may be, for example, a server, laptop computer, desktop computer, node of a distributed system, etc. The computing device may include one or more processors, memory (e.g., random access memory), and/or persistent storage (e.g., disk drives, solid-state drives, etc.). The persistent storage may store computer instructions, e.g., computer code, that (when executed by the processor(s) of the computing device) cause the computing device to perform the functions of the information handling system (100) described in this application and/or all, or a portion, of the method illustrated in FIG. 5. The information handling system (100) may be implemented using other types of computing devices without departing from the invention. For additional details regarding computing devices, refer to FIG. 9.

While the information handling system (100) has been illustrated and described as including a limited number of specific components, an information handling system in accordance with embodiments of the invention may include additional, fewer, and/or different components without departing from the invention.

Turning to FIG. 2, FIG. 2 shows a diagram of the local hardware resources (118) in accordance with one or more embodiments of the invention. As noted above, system control processors of the information handling system may present resources including, for example, some of the local hardware resources (118) to form a LCS.

The local hardware resources (118) may include any number and types of hardware devices that may provide any quantity and type of computing resources. For example, the hardware resources (118) may include storage devices (200), memory devices (202), and special purpose devices (204).

The storage devices (200) may provide storage resources (e.g., persistent storage) in which applications hosted by a LCS may store data including any type and quantity of information. The storage devices (200) may include any type and quantity of devices for storing data. The devices may include, for example, hard disk drives, solid-state drives, tape drives, etc. The storage devices (200) may include other types of devices for providing storage resources without departing from the invention. For example, the storage devices (200) may include controllers (e.g., redundant array of disk controllers), load balancers, and/or other types of devices.

In one or more embodiments of the invention, the storage devices (200) may include functionality for performing self-encryption. Specifically, the storage devices (200) may utilize the security keys to encrypt their respective data. As such, the storage devices (130) may be referred to as, for example, self-encrypting devices or self-encryption drives (SEDs). For additional details, see, e.g., FIGS. 5-6.

The memory devices (202) may provide memory resources (e.g., transitory and/or persistent storage) in which a LCS may store data including any type and quantity of information. The memory devices (202) may include any type and quantity of devices for storing data. The devices may include, for example, transitory memory such as random access memory, persistent memory such as enterprise class memory, etc. The memory devices (202) may include other types of devices for providing memory resources without departing from the invention. For example, the storage devices (200) may include controllers (e.g., replication managers), load balancers, and/or other types of devices.

The special purpose devices (204) may provide other types of computing resources (e.g., graphics processing resources, computation acceleration resources, etc.) to LCSs. The special purpose devices (204) may include any type and quantity of devices for providing other types of computing resources. The special purpose devices (204) may include, for example, graphics processing units for providing graphics processing resources, compute accelerators for accelerating corresponding workloads performed by LCSs, application-specific integrated circuits (ASICs) for performing other functionalities, digital signal processors for facilitating high speed communications, field-programmable gate arrays (FPGAs), etc. The special purpose devices (204) may include other types of devices for providing other types of computing resources without departing from the invention.

The system control processors of the information handling systems may mediate presentation of the computing resources provided by the hardware resources (118) to computing resource sets (e.g., as bare metal resources to processors). When doing so, the system control processors may provide a layer of abstraction that enables the hardware resources (118) to be, for example, virtualized, emulated as being compatible with other systems, and/or directly connected to the compute resource sets (e.g., pass through). Consequently, the computing resources of the hardware resources (118) may be finely, or at a macro level, allocated to different LCSs.

Additionally, the system control processors may manage operation of these hardware devices in accordance with one or more models including, for example, data protection models, security models, workload performance availability models, reporting models, etc. For example, the system control processors may instantiate redundant performance of workloads for high availability services.

The manner of operation of these devices may be transparent to the computing resource sets utilizing these hardware devices for providing computer implemented services. Consequently, even though the resulting LCS control plane may be unaware of the implementation of these models, the LCSs may still operate in accordance with these models thereby providing a unified method of managing the operation of LCSs.

While the local hardware resources (118) have been illustrated and described as including a limited number of specific components, local hardware resources in accordance with embodiments of the invention may include additional, fewer, and/or different components without departing from the invention.

As discussed above, information handling systems may include system control processors that may be used to instantiate LCSs. FIG. 3 shows a diagram of a system control processor (298) in accordance with one or more embodiments of the invention. Any of the system control processors included in control resources sets of FIG. 1.2 may be similar to the system control processor (298) illustrated in FIG. 3.

The system control processor (298) may facilitate instantiation and operation of LCSs. By doing so, a system that includes information handling systems may dynamically instantiate LCSs to provide computer implemented services.

To instantiate and operate LCSs, the system control processor (298) may include a composition manager (300), a utilization manager (301), a physical resources manager (302), an emulated resources manager (304), a virtual resources manager (306), an operation manager (308), one or more trusted execution environments (TEEs) (320, 322), hardware resource services (310), and storage (312). Each of these components of the system control processor is discussed below.

The composition manager (300) may manage the process of instantiating and operating LCSs. To provide these management services, the composition manager (300) may include functionality to (i) obtain information regarding the hardware components of the information handling system (e.g., obtain telemetry data regarding the information handling system), (ii) provide the obtained information to other entities (e.g., management entities such as system control processor manager (50, FIG. 1.1)), (iii) obtain composition requests for LCSs, (iv) based on the composition requests, prepare and present resources as bare metal resources to compute resource sets, (v) instantiate applications in LCSs to cause the LCSs to provide computer implemented services, conform their operation to security models, etc., (vi) manage the operation of the LCSs by, for example, duplicating performance of workloads to improve the likelihood that the output of workloads are available, (vii) add/remove/modify resources presented to the compute resource sets of LCSs dynamically in accordance with workloads being performed by the LCSs, and/or (viii) coordinate with other system control processors to provide distributed system functionalities. By providing the above functionalities, a system control processor in accordance with one or more embodiments of the invention may enable distributed resources from any number of information handling systems to be aggregated into a LCS to provide computer implemented services.

To obtain information regarding the hardware components of the information handling system, the composition manager (300) may inventory the components of the information handling system hosting the system control processor. The inventory may include, for example, the type and model of each hardware component, versions of firmware or other code executing on the hardware components, and/or information regarding hardware components of the information handling system that may be allocated to form LCSs.

The composition manager (300) may obtain composition requests from other entities (e.g., management entities tasked with instantiating LCSs), as pre-loaded instructions present in storage of the system control processor, and/or via other methods. The composition requests may specify, for example, the types and quantities of computing resources to be allocated to a LCS.

In one or more embodiments of the invention, the composition requests specify the computing resource allocations using an intent-based model. For example, rather than specifying specific hardware devices (or portions thereof) to be allocated to a particular compute resource set to obtain a LCS, the resource requests may only specify that a LCS is to be instantiated having predetermined characteristics, that a LCS will perform certain workloads or execute certain applications, and/or that the LCS be able to perform one or more predetermined functionalities. In such a scenario, the composition manager may decide how to instantiate the LCS (e.g., which resources to allocate, how to allocate the resources (e.g., virtualization, emulation, redundant workload performance, data integrity models to employ, etc.), to which compute resource set(s) to present corresponding computing resources, etc.).

In one or more embodiments of the invention, the composition requests specify the computing resource allocations using an explicit model. For example, the composition requests may specify (i) the resources to be allocated, (ii) the manner of presentation of those resources (e.g., emulating a particular type of device using a virtualized resource vs. path through directly to a hardware component), and (iii) the compute resource set(s) to which each of the allocated resources are to be presented.

In addition to specifying resource allocations, the composition requests may also specify, for example, applications to be hosted by the LCSs, security models to be employed by the LCSs, communication models to be employed by the LCSs, services to be provided to the LCSs, user/entity access credentials for use of the LCSs, and/or other information usable to place the LCSs into states in which the LCSs provide desired computer implemented services.

To prepare and present resources to compute resource sets based on the composition requests, the system control processors may implement, for example, abstraction, indirection, virtualization, mapping, emulation, and/or other types of services that may be used to present any type of resources as a resource that is capable of bare metal utilization by compute resource sets. To provide these services, the composition manager (300) may invoke the functionality of the physical resources manager (302), the emulated resources manager (304), and/or the virtual resources manager (306).

Additionally, the system control processors may take into account an importance of completion of workloads when preparing and presenting resources. For example, some workloads that may be performed by various hardware devices may be critical (e.g., high availability workloads) to the computer implemented services to be provided by a LCS. In such a scenario, the system control processor may over-allocate resources (e.g., beyond that requested by a compute resource set) for performance of the workloads so that at least two instances of the workloads can be performed using duplicative resources. By doing so, it may be more likely that at least one of the workloads will be completed successfully. Consequently, the system control processor may provide the output of one of the workloads to compute resource sets of a LCS.

When presenting the resources to the compute resource sets, the system control processor (298) may present the resources using an emulated data plane. For example, the system control processors (298) may receive bare metal communications (e.g., IO from the processors) and respond in a manner consistent with responses of corresponding bare metal devices (e.g., memory). When doing so, the system control processor (298) may translate the communications into actions. The actions may be provided to the hardware devices used by the system control processor (298) to present the bare metal resources to the compute resource set(s). In turn, the hardware devices may perform the actions which results in a LCS providing desired computer implemented services.

In some scenarios, multiple system control processors may cooperate to present bare metal resources to a compute resource set. For example, a single information handling system may not include sufficient hardware devices to present a quantity and/or type of resource to a compute resource set as specified by a composition request (e.g., present two storage devices to a compute resource set when a single information handling system only includes a single storage device). In this scenario, a second system control processor of a second information handling system operably connected to the system control processor tasked with presenting the resources to a compute resource set may prepare one of its storage devices for presentation. Once prepared, the second system control processor may communicate with the system control processor to enable the system control processor to present the prepared storage device (i.e., the storage device in the information handling system) to the compute resource set. By doing so, resources from multiple information handling systems may be aggregated to present a desired quantity of resources to compute resource set(s) to form a LCS.

By forming LCSs as discussed above, embodiments of the invention may provide a system that is able to effectively utilize distributed resources across a range of devices to provide computer implemented services.

After a LCS is formed, a client may begin to utilize the hardware devices of the LCS. The utilization manager (301) may monitor the use of these hardware devices by the client.

To do so, the utilization manager (301) may (i) monitor the components of the compute resource sets including the actions being performed, power being consumed, communications sent, etc., (ii) monitor communications from the compute resource sets destined for other hardware devices (e.g., of hardware resource sets, other compute resource sets of other information handling systems, external resources, etc.) by intercepting them as they traverse the system control processor (298), (iii) based on the intercepted communications, estimate use rates (e.g., use rate information) of these hardware devices by the client, (iv) store the use rate information (e.g., including estimates, measurements, etc.), and (v) perform action sets based on the use rate information. The action sets may include, for example, modifying the computing resources allocated to a LCS, notifying clients of the use/use rates of computing resources of LCSs, and/or otherwise take action based on collected use rate information.

The physical resources manager (302) may manage presentation of resources to compute resource sets. For example, the physical resources manager (302) may generate, for example, translation tables that specify actions to be performed in response to bare metal communications obtained from compute resource sets. The translation tables may be used to take action in response to communications from compute resource sets.

The physical resources manager (302) may generate the translation tables based on the components of the compute resource sets, allocations or other types of commands/communications obtained from the compute resource sets, and the resources of the information handling system allocated to service the compute resource set. For example, when a compute resource set is presented with a bare metal resource, it may go through a discovery process to prepare the bare metal resource for use. As the discovery process proceeds, the compute resource set may send commands/communications to the bare metal resource to, for example, discover its address range. The physical resources manager (302) may monitor this process, respond appropriately, and generate the translation table based on these commands and the resources available to service these bare metal commands/communications.

For example, consider a scenario where a virtualized disk is allocated to service bare metal storage commands from a compute resource set. In such a scenario, the physical resources manager (302) may generate a translation table that translates physical write from the compute resource set to virtualized writes corresponding to the virtualized disk. Consequently, the virtualized disk may be used by the system control processor (298) to present bare metal resources to the compute resource set.

The emulated resources manager (304) may generate emulation tables that enable resources that would otherwise be incompatible with a compute resource set to be compatible with the compute resource set. Different types of hardware devices of a compute resource set may be compatible with different types of hardware devices. Consequently, resources allocated to provide bare metal resources may not necessarily be compatible with the hardware devices of a compute resource set. The emulated resources manager (304) may generate emulation tables that map bare metal communications obtained from a compute resource set to actions that are compatible with resources allocated to provide bare metal resources to the compute resource sets.

The virtual resources manager (306) may manage virtualized resources that may be allocated to provide bare metal resources to compute resource sets. For example, the virtual resources manager (306) may include hypervisor functionality to virtualized hardware resources and allocate portions of the virtualized resources for use in providing bare metal resources.

While the physical resources manager (302), emulated resources manager (304), and virtual resources manager (306) have been described as generating tables, these components of the system control processor may generate other types of data structures or utilize different management models to provide their respective functionalities without departing from the invention.

The functionalities of the physical resources manager (302), emulated resources manager (304), and virtual resources manager (306) may be utilized in isolation and/or combination to provide bare metal resources to compute resource sets. By doing so, the system control processor (298) may address compatibility issues, sizing issues to match available resources to those that are to be allocated, and/or other issues to enable bare metal resources to be presented to compute resource sets.

When providing bare metal resources, the composition manager (300) may invoke the functionality of the physical resources manager (302), emulated resources manager (304), and virtual resources manager (306). Consequently, resources may be presented as bare metal resources via pass-through (i.e., forwarding IO from compute resource sets to hardware devices), bare metal resource addressing of virtualized resources, and/or as emulated resources compatible with the hardware components of the compute resource set.

The functionality of the physical resources manager (302), emulated resources manager (304), and virtual resources manager (306) may be invoked using any communication model including, for example, message passing, state sharing, memory sharing, etc.

The operation manager (308) may manage the general operation of the system control processor (298). For example, the operation manager (308) may operate as an operating system or other entity that manages the resources of the system control processor (298). The composition manager (300), the utilization manager (301) physical resources manager (302), emulated resources manager (304), virtual resources manager (306), and/or other entities hosted by the system control processor (298) may call or otherwise utilize the operation manager (308) to obtain appropriate resources (e.g., processing resources, memory resources, storage, communications, etc.) to provide their functionalities.

The hardware resource services (310) may facilitate use of the hardware components of any number of hardware resource sets (e.g., 110, FIG. 1.1). For example, the hardware resource services (310) may include driver functionality to appropriately communicate with the hardware devices of hardware resource sets. The hardware resource services (310) may be invoked by, for example, the operation manager (308).

The system control processor (298) may be implemented using computing devices. The computing devices may be, for example, an embedded computing device such as a system on a chip, a processing device operably coupled to memory and storage, or another type of computing device. The computing device may include one or more processors, memory (e.g., random access memory), and/or persistent storage (e.g., disk drives, solid-state drives, etc.). The persistent storage may store computer instructions, e.g., computer code, that (when executed by the processor(s) of the computing device) cause the computing device to perform the functions of the system control processor (298) described in this application and/or all, or a portion, of the methods illustrated in FIG. 5. The system control processor (298) may be implemented using other types of computing devices without departing from the invention. For additional details regarding computing devices, refer to FIG. 9.

In one or more embodiments of the invention, the system control processor (298) is implemented as an on-board device. For example, the system control processor (298) may be implemented using a chip including circuitry disposed on a circuit card. The circuit card may also host the compute resource sets and/or hardware resource sets managed by the system control processor (298).

In one or more embodiments of the invention, the composition manager (300), utilization manager (301), physical resources manager (302), emulated resources manager (304), virtual resources manager (306), operation manager (308), and/or hardware resource services (310) are implemented using a hardware device including circuitry. The hardware device may be, for example, a digital signal processor, a field programmable gate array, or an application-specific integrated circuit. The circuitry may be adapted to cause the hardware device to perform the functionality of the composition manager (300), the utilization manager (301), physical resources manager (302), emulated resources manager (304), virtual resources manager (306), operation manager (308), and/or hardware resource services (310). The composition manager (300), utilization manager (301) physical resources manager (302), emulated resources manager (304), virtual resources manager (306), operation manager (308), and/or hardware resource services (310) may be implemented using other types of hardware devices without departing from the invention.

In one or more embodiments of the invention, the composition manager (300), utilization manager (301), physical resources manager (302), emulated resources manager (304), virtual resources manager (306), operation manager (308), and/or hardware resource services (310) are implemented using a processor adapted to execute computing code stored on a persistent storage (e.g., as part of the system control processor (298) or operably connected to the system control processor (298) thereby enabling processors of the system control processor (298) to obtain and execute the computing code) that when executed by the processor performs the functionality of the composition manager (300), utilization manager (301), physical resources manager (302), emulated resources manager (304), virtual resources manager (306), operation manager (308), and/or hardware resource services (310). The processor may be a hardware processor including circuitry such as, for example, a central processing unit or a microcontroller. The processor may be other types of hardware devices for processing digital information without departing from the invention.

As used herein, an entity that is programmed to perform a function (e.g., step, action, etc.) refers to one or more hardware devices (e.g., processors, digital signal processors, field programmable gate arrays, application-specific integrated circuits, etc.) that provide the function. The hardware devices may be programmed to do so by, for example, being able to execute computer instructions (e.g., computer code) that cause the hardware devices to provide the function. In another example, the hardware device may be programmed to do so by having circuitry that has been adapted (e.g., modified) to perform the function. An entity that is programmed to perform a function does not include computer instructions in isolation from any hardware devices. Computer instructions may be used to program a hardware device that, when programmed, provides the function.

In one or more embodiments, the TEEs (320, 322) are each an environment that securely stores sensitive information via secured storage (not shown in FIG. 3). The sensitive information may be, for example, security keys of an asymmetrical or symmetrical encryption mechanism. The security keys may be used for resource protection such as, e.g., encryption and/or decryption of storage devices associated with a corresponding tenant and/or LCS. The sensitive information such as security keys may be obtained from the KMSs (60, FIG. 1.1). The sensitive information may be used for resource protection in accordance with FIGS. 5-6.

Further, the sensitive information may be used to verify the identity of each LCS. The TEE (320, 322) may be provided by the system control processor manager and/or any other system control processors in the information handling systems. To perform the aforementioned verification, each TEE (320, 322) may store a table of LCS-key pairings in the secured storage of the TEE (320, 322) and use the LCS-key pairings to verify whether a LCS is authorized to access the resources via the system control processor (298). The verification may be performed in accordance with FIGS. 7-8.

In one or more embodiments, each TEE (320, 322) may be associated with a tenant. In this manner, the storage of sensitive information by one TEE (320, 322) is only for one tenant, and other tenants are unable to access the sensitive information. Further, each TEE may store sensitive information for one or more LCSs of one corresponding tenant.

In one or more embodiments, the TEEs (320, 322) may be executed in the system control processor manager (50, FIG. 1.1). In such embodiments, the TEEs (320, 322) may utilize the secured storage (and other resources) of the system control processor manager (50, FIG. 1.1). Such embodiments of the TEEs (320, 322) may be illustrated in FIG. 4.

In one or more embodiments disclosed herein, the storage (312) is implemented using physical devices that provide data storage services (e.g., storing data and providing copies of previously stored data). The devices that provide data storage services may include hardware devices and/or logical devices. For example, storage (312) may include any quantity and/or combination of memory devices (i.e., volatile storage), long-term storage devices (i.e., persistent storage), other types of hardware devices that may provide short-term and/or long-term data storage services, and/or logical storage devices (e.g., virtual persistent storage/virtual volatile storage).

For example, storage (312) may include a memory device (e.g., a dual in-line memory device) in which data is stored and from which copies of previously stored data are provided. In another example, storage (312) may include a persistent storage device (e.g., a solid-state disk drive) in which data is stored, and from which copies of previously stored data is provided. In a still further example, storage (312) may include (i) a memory device (e.g., a dual in-line memory device) in which data is stored and from which copies of previously stored data are provided and (ii) a persistent storage device that stores a copy of the data stored in the memory device (e.g., to provide a copy of the data in the event that power loss or other issues with the memory device that may impact its ability to maintain the copy of the data cause the memory device to lose the data).

The storage (312) may also be implemented using logical storage. A logical storage (e.g., virtual disk) may be implemented using one or more physical storage devices whose storage resources (all, or a portion) are allocated for use using a software layer. Thus, a logical storage may include both physical storage devices and an entity executing on a processor or other hardware device that allocates the storage resources of the physical storage devices.

The storage (312) may store data structures including, for example, LCS data (314), a resource map (316), and a utilization map (318). Each of these data structures is discussed below.

The LCS data (314) may be implemented using one or more data structures that include information regarding LCSs. For example, the LCS data (314) may specify identifiers of LCSs and resources that have been allocated to the LCSs.

The LCS data (314) may also include information regarding the operation of the LCSs. The information may include, for example, workload performance data, resource utilization rates over time, and/or other information that may be utilized to manage the operation of the LCSs.

The LCS data (314) may further include information regarding management models employed by system control processors. For example, the LCS data (314) may include information regarding duplicative data stored for data integrity purposes, redundantly performed workloads to meet high availability service requirements, encryption schemes utilized to prevent unauthorized access of data, etc.

The LCS data (314) may be maintained by, for example, the composition manager (300). For example, the composition manager (300) may add, remove, and/or modify information included in the LCS data (314) to cause the information included in the LCS data (314) to reflect the state of the LCSs.

The data structures of the LCS data (314) may be implemented using, for example, lists, tables, unstructured data, databases, etc. While illustrated in FIG. 3 as being stored locally, the LCS data (314) may be stored remotely and may be distributed across any number of devices without departing from the invention.

The resource map (316) may be implemented using one or more data structures that include information regarding resources of the information handling system and/or other information handling systems. For example, the resource map (316) may specify the type and/or quantity of resources (e.g., hardware devices, virtualized devices, etc.) available for allocation and/or that are already allocated to LCSs. The resource map (316) may be used to provide data to management entities such as system control processor managers.

The data structures of the resource map (316) may be implemented using, for example, lists, tables, unstructured data, databases, etc. While illustrated in FIG. 3 as being stored locally, the resource map (316) may be stored remotely and may be distributed across any number of devices without departing from the invention.

The resource map (316) may be maintained by, for example, the composition manager (300). For example, the composition manager (300) may add, remove, and/or modify information included in the resource map (316) to cause the information included in the resource map (316) to reflect the state of the information handling system and/or other information handling systems.

The utilization map (318) may be implemented using one or more data structures that includes information regarding the utilization of hardware devices of the LCSs. For example, the utilization map (318) may specify identifiers of clients, identifiers of LCSs, and resources of the LCSs that have been utilized by the clients.

The utilization map (318) may specify the resource utilization via any method. For example, the utilization map (318) may specify a quantity of utilization, resource utilization rates over time, power consumption of hardware devices while utilized by clients, workloads performed using hardware devices for clients, etc. The utilization map (318) may include other types of information used to quantify the utilization of hardware devices by clients without departing from the invention.

The utilization map (318) may be maintained by, for example, the utilization manager (301). For example, the utilization manager (301) may add, remove, and/or modify information included in the utilization map (318) to cause the information included in the utilization map (318) to reflect the current utilization of the LCSs.

The data structures of the utilization map (318) may be implemented using, for example, lists, tables, unstructured data, databases, etc. While illustrated in FIG. 3 as being stored locally, the utilization map (318) may be stored remotely and may be distributed across any number of devices without departing from the invention.

While the storage (312) has been illustrated and described as including a limited number and type of data, a storage in accordance with embodiments of the invention may store additional, less, and/or different data without departing from the invention.

While the system control processor (298) has been illustrated and described as including a limited number of specific components, a system control processor in accordance with embodiments of the invention may include additional, fewer, and/or different components without departing from the invention.

Figure 4:
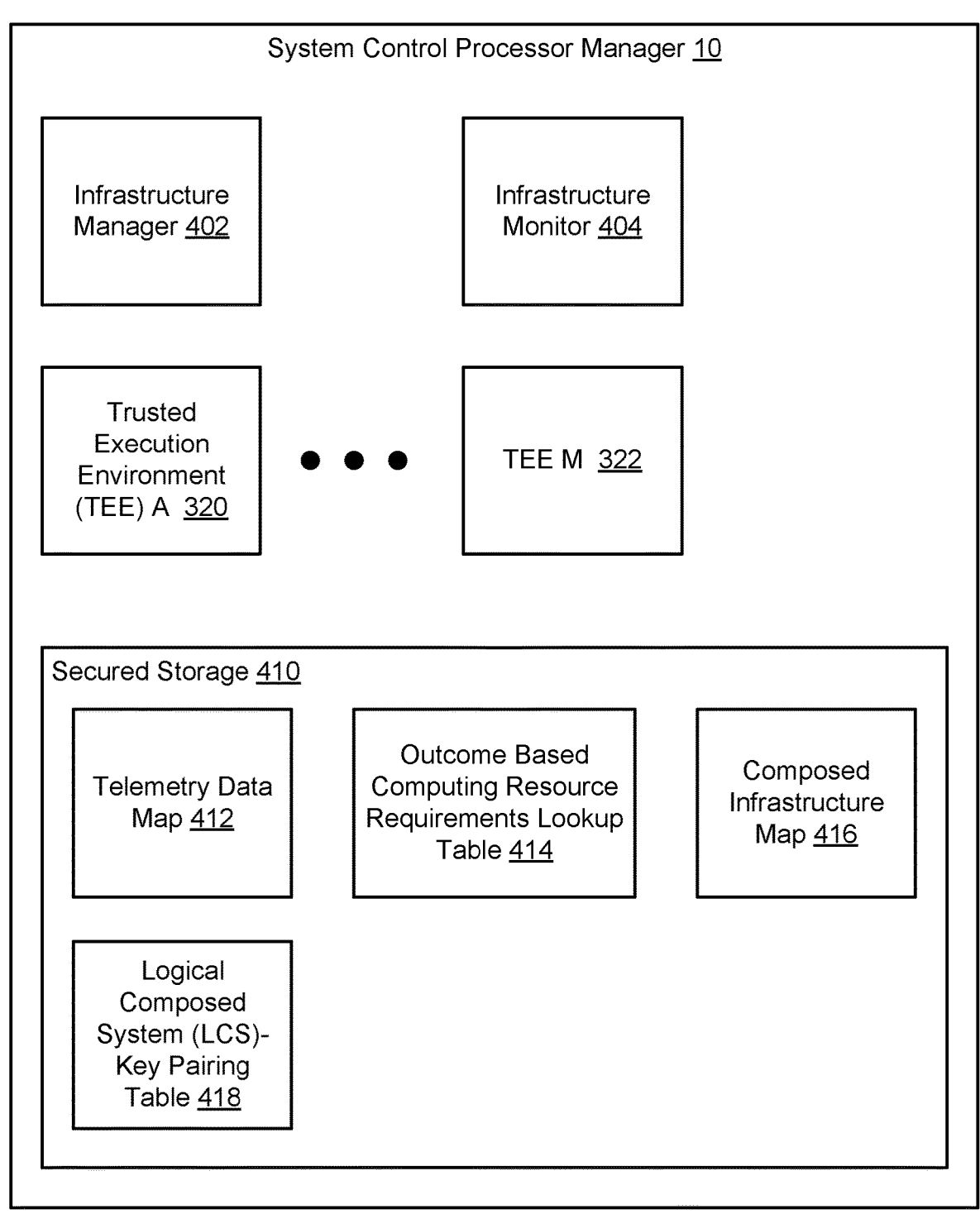
FIG. 4 shows a diagram of a system control processor manager in accordance with one or more embodiments of the invention.

As discussed above, a system control processor manager may cooperate with system control processors of control resource sets to instantiate LCSs by presenting computing resources from hardware resource sets to processors of compute resource sets. FIG. 4 shows a diagram of the system control processor manager (50) in accordance with one or more embodiments of the invention.

The system control processor manager (50) may manage the process of instantiating LCSs. To do so, the system control processor manager (50) may include an infrastructure manager (402), an infrastructure monitor (404), and secured storage (410). Each of these components is discussed below.

The infrastructure manager (402) may provide composition services. Composition services may include obtaining composition requests for LCSs, determining the resources to allocate to instantiate LCSs, and cooperating with system control processors to allocate the identified resources. By doing so, the infrastructure manager (402) may cause any number of computer implemented services to be provided using the LCSs.

To determine the resources to allocate to LCSs, the infrastructure manager (402) may employ an intent-based model that translates an intent expressed in a composition request to one or more allocations of computing resources. For example, the infrastructure manager (402) may utilize an outcome-based computing resource requirements lookup table (414) to match an expressed intent to resources to be allocated to satisfy that intent. The outcome-based computing resource requirements lookup table (414) may specify the type, quantity, method of management, and/or other information regarding any number of computing resources that when aggregated will be able to satisfy a corresponding intent. The infrastructure manager (402) may identify resources for allocation to satisfy composition requests via other methods without departing from the invention.

To cooperate with the system control processors, the infrastructure manager (402) may obtain telemetry data regarding the computing resources of any number of information handling systems and/or external resources that are available for allocation. The infrastructure manager (402) may aggregate this data in a telemetry data map (412) which may be subsequently used to identify resources of any number of information handling systems and/or external resources to satisfy composition requests (e.g., instantiate one or more LCSs to meet the requirements of the composition requests).

When the infrastructure manager (402) identifies the computing resources to be allocated, the infrastructure manager (402) may communicate with any number of system control processors to implement the identified allocations. For example, the infrastructure manager (402) may notify a system control processor of a control resource set that portions of a hardware resource set are to be allocated to a compute resource set to instantiate a LCS. The system control processor may then take action (e.g., prepare the portion of the hardware resource set for presentation to a processor of the compute resource set) in response to the notification.

As LCSs are instantiated, the infrastructure manager (402) may add information reflecting the resources allocated to LCSs, the workloads being performed by the LCSs, and/or other types of information to a composed infrastructure map (416). The infrastructure manager (402) may utilize this information to, for example, decide whether computing resources should be added to or removed from LCS. Consequently, computing resources may be dynamically re-provisioned over to meet changing workloads imposed on LCSs.

In one or more embodiments of the invention, the infrastructure manager (402) is implemented using a hardware device including circuitry. The hardware device may be, for example, a digital signal processor, a field programmable gate array, or an application-specific integrated circuit. The circuitry may be adapted to cause the hardware device to perform the functionality of the infrastructure manager (402). The infrastructure manager (402) may be implemented using other types of hardware devices without departing from the invention.

In one or more embodiments of the invention, the infrastructure manager (402) is implemented using a processor adapted to execute computing code stored on a persistent storage that when executed by the processor performs the functionality of the infrastructure manager (402). The processor may be a hardware processor including circuitry such as, for example, a central processing unit or a microcontroller. The processor may be other types of hardware devices for processing digital information without departing from the invention.

The infrastructure monitor (404) may provide computing resource monitoring services. Computing resource monitoring services may include obtaining computing resource use information from one or more system control processors, storing the obtained information to obtain a composed infrastructure map (416), and initiate an action to be performed based on the information included in the composed infrastructure map (416). By doing so, the infrastructure monitor (404) enables utilization of information for any number of LCSs and clients.

In one or more embodiments of the invention, the infrastructure monitor (404) is implemented using a hardware device including circuitry. The hardware device may be, for example, a digital signal processor, a field programmable gate array, or an application-specific integrated circuit. The circuitry may be adapted to cause the hardware device to perform the functionality of the infrastructure monitor (404). The infrastructure monitor (404) may be implemented using other types of hardware devices without departing from the invention.

In one or more embodiments of the invention, the infrastructure monitor (404) is implemented using a processor adapted to execute computing code stored on a persistent storage that when executed by the processor performs the functionality of the infrastructure monitor (404). The processor may be a hardware processor including circuitry such as, for example, a central processing unit or a microcontroller. The processor may be other types of hardware devices for processing digital information without departing from the invention.

In one or more embodiments, the TEEs (320, 322) are each an environment that securely stores sensitive information via secured storage (not shown in FIG. 3). The sensitive information may be, for example, security keys of an asymmetrical or symmetrical encryption mechanism. The security keys may be used for resource protection such as, e.g., encryption and/or decryption of storage devices associated with a corresponding tenant and/or LCS. The sensitive information such as security keys may be obtained from the KMSs (60, FIG. 1.1). The sensitive information may be used for resource protection in accordance with FIGS. 5-6.

Further, the sensitive information may be used to verify the identity of each LCS. The TEE (320, 322) may be provided by the system control processor manager and/or any other system control processors in the information handling systems. To perform the aforementioned verification, each TEE (320, 322) may store a table of LCS-key pairings in the secured storage of the TEE (320, 322) and use the LCS-key pairings to verify whether a LCS is authorized to access the resources via the system control processor manager (10). The verification may be performed in accordance with FIGS. 7-8.

In one or more embodiments, each TEE (320, 322) may be associated with a tenant. In this manner, the storage of sensitive information by one TEE (320, 322) is only for one tenant, and other tenants are unable to access the sensitive information. Further, each TEE may store sensitive information for one or more LCSs of one corresponding tenant.

In one or more embodiments of the invention, each TEE (320, 322) is implemented using a hardware device including circuitry. The hardware device may be, for example, a digital signal processor, a field programmable gate array, or an application-specific integrated circuit. The circuitry may be adapted to cause the hardware device to perform the functionality of the TEE (320, 322). The TEE (320, 322) may be implemented using other types of hardware devices without departing from the invention.

In one or more embodiments of the invention, each TEE (320, 322) is implemented using a processor adapted to execute computing code stored on a persistent storage that when executed by the processor performs the functionality of the TEE (320, 322). The processor may be a hardware processor including circuitry such as, for example, a central processing unit or a microcontroller. The processor may be other types of hardware devices for processing digital information without departing from the invention.

In one or more embodiments disclosed herein, the secured storage (410) is implemented using physical devices that provide data storage services (e.g., storing data and providing copies of previously stored data). The devices that provide data storage services may include hardware devices and/or logical devices. For example, the secured storage (410) may include any quantity and/or combination of memory devices (i.e., volatile storage), long-term storage devices (i.e., persistent storage), other types of hardware devices that may provide short-term and/or long-term data storage services, and/or logical storage devices (e.g., virtual persistent storage/virtual volatile storage).

For example, the secured storage (410) may include a memory device (e.g., a dual in-line memory device) in which data is stored securely (e.g., only accessible by the system control processor manager (10) or any component therein) and from which copies of previously stored data are provided. In another example, the secured storage (410) may include a persistent storage device (e.g., a solid-state disk drive) in which data is stored and from which copies of previously stored data is provided. In a still further example, the secured storage (410) may include (i) a memory device (e.g., a dual in-line memory device) in which data is stored and from which copies of previously stored data are provided and (ii) a persistent storage device that stores a copy of the data stored in the memory device (e.g., to provide a copy of the data in the event that power loss or other issues with the memory device that may impact its ability to maintain the copy of the data cause the memory device to lose the data).

The secured storage (410) may also be implemented using logical storage. A logical storage (e.g., virtual disk) may be implemented using one or more physical storage devices whose storage resources (all, or a portion) are allocated for use using a software layer. Thus, a logical storage may include both physical storage devices and an entity executing on a processor or other hardware device that allocates the storage resources of the physical storage devices.

Figure 7:
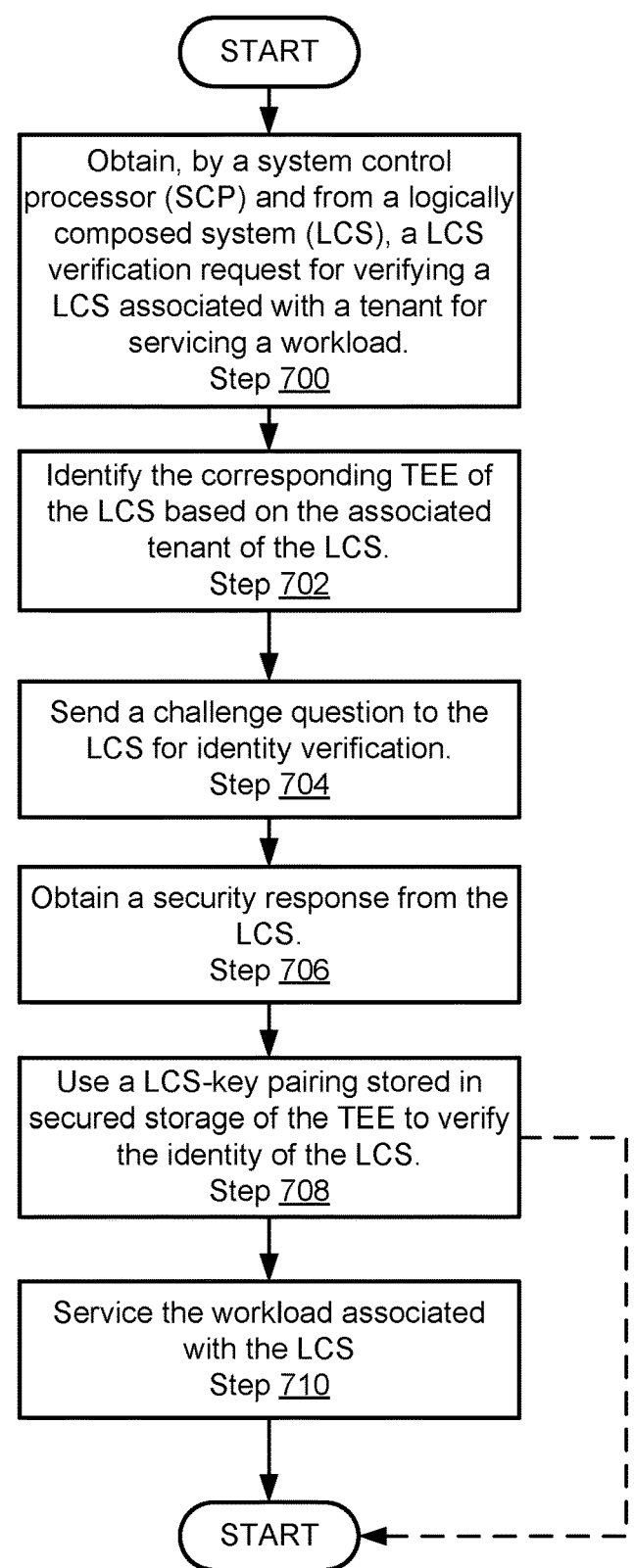
FIG. 7 shows a flowchart of a method of verifying the identity of a logically composed system in accordance with one or more embodiments of the invention.
Figure 8:
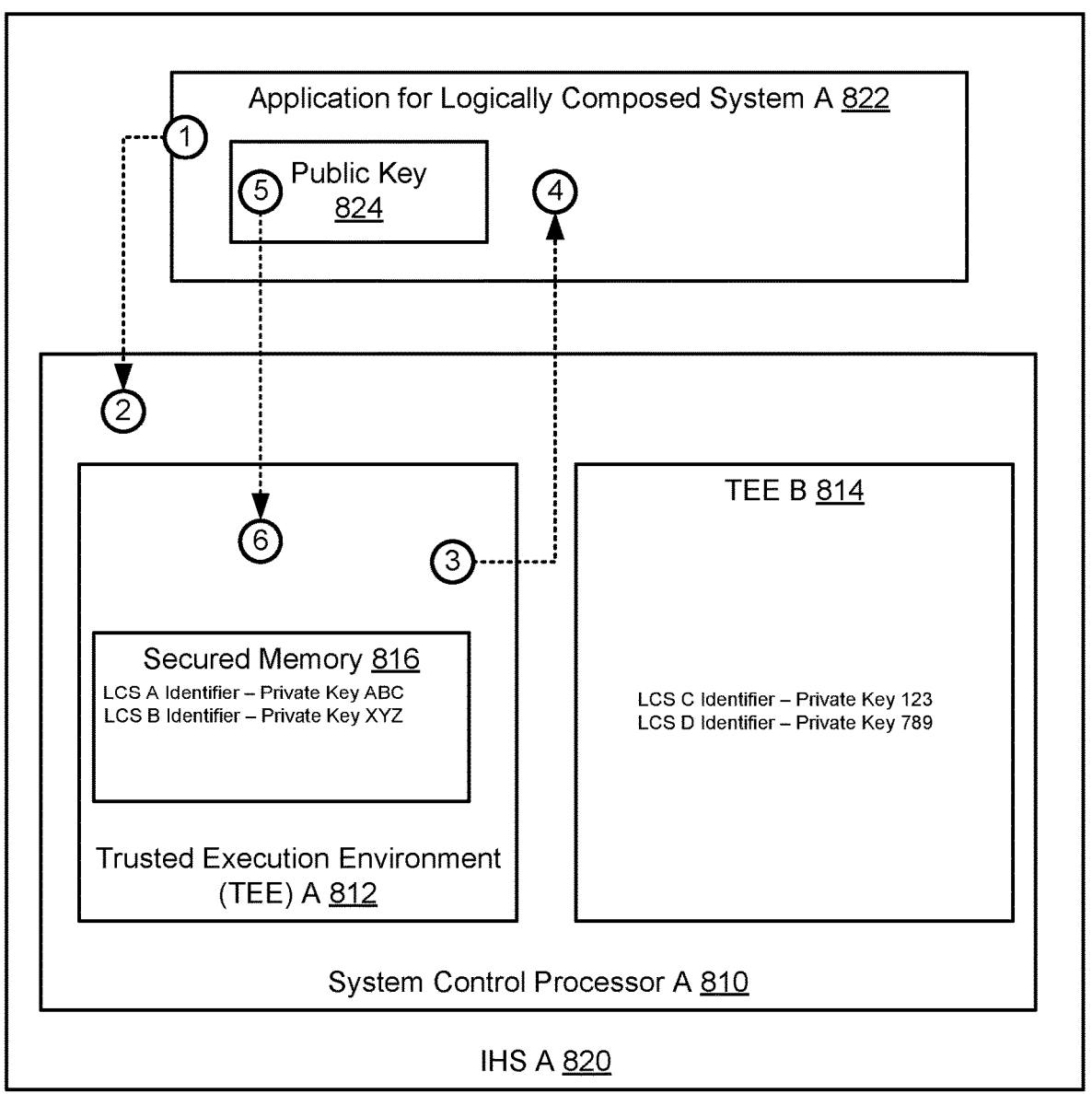
FIG. 8 shows a diagram of the operation of a second example system over time in accordance with one or more embodiments of the invention.

The secured storage (410) may store data structures including, for example, the telemetry data map (412), outcome-based computing resource requirements lookup table (414), the composed infrastructure map (416), and a LCS-key pairing table (418) (further discussed in FIGS. 7-8). These data structures may be maintained by, for example, the infrastructure manager (402). For example, the infrastructure manager (402) may add, remove, and/or modify information included in these data structures to cause the information included in these data structures to reflect the state of any number of information handling systems, external resources, and/or LCSs.

Any of these data structures may be implemented using, for example, lists, tables, unstructured data, databases, etc. While illustrated in FIG. 4 as being stored locally, any of these data structures may be stored remotely and may be distributed across any number of devices without departing from the invention.

While the secured storage (410) has been illustrated and described as including a limited number and type of data, a storage in accordance with embodiments of the invention may store additional, less, and/or different data without departing from the invention.

While the system control processor manager (10) has been illustrated and described as including a limited number of specific components, a system control processor manager in accordance with embodiments of the invention may include additional, fewer, and/or different components than those illustrated in FIG. 4 without departing from the invention.

FIG. 5 shows a flowchart of a method in accordance with one or more embodiments of the invention. The method depicted in FIG. 5 may be performed to broker key management using a trusted execution environment in accordance with one or more embodiments of the invention. The method shown in FIG. 5 may be performed by, for example, a system control processor manager (e.g., 50, FIG. 1.1). Other components of the system in FIG. 1.1 may perform all, or a portion, of the method of FIG. 5 without departing from the invention.

While FIG. 5 is illustrated as a series of steps, any of the steps may be omitted, performed in a different order, additional steps may be included, and/or any or all of the steps may be performed in a parallel and/or partially overlapping manner without departing from the invention.

In step 500, a configuration request is obtained for a trusted environment (TEE) associated with a tenant. In one or more embodiments, the configuration request specifies a set of storage devices (e.g., self-encryption drives (SEDs)) to which the tenant requests a security operation be performed. The security operation includes, for example, an encryption of the storage devices such that access to the data is not available without the use of one or more security key(s). In one or more embodiments of the invention, a security key is a data structure used to either secure the data in the storage devices (e.g., via encryption) or unlock the data. For example, the security key may be used for symmetric encryption or asymmetric encryption without departing from the invention.

In step 502, a TEE associated with the tenant is generated. In one or more embodiments, a trusted set of resources is reserved for the use of the functionality of the TEE for the secured storage (e.g., in secured memory) of a set of keys (e.g., security keys). The reservation of the trusted set of resources results in the generation of the TEE.

In one or more embodiments, the TEE executes in the system control processor manager described throughout FIG. 5. Said another way, the trusted set of resources reserved for the TEE is obtained from the system control processor manager, such that the system control processor manager shares its resources with the TEE.

In one or more embodiments, the TEE executes in a system control processor that is different from the system control processor manager. Said another way, the trusted set of resources reserved for the TEE is obtained from a second system control processor.

In step 504, the system control processor manager communicates with a key management system (KMS) to obtain a set of security keys associated with the generated TEE. In one or more embodiments, the KMS establishes a secured connection (e.g., virtual private networks, secure socket layer, etc.) to the system control processor manager. After this secured connection is established, the KMS provides the set of security keys. The set of security keys may be stored in secured memory of the TEE.

In step 506, one or more secured storage devices associated with the tenant is configured using the obtained set of keys in the TEE. In one or more embodiments, the secured storage devices are configured by implementing a security operation via encryption to the set of storage devices to make each storage device secured. As a first example, the security operation may include an encryption algorithm to the data such that the data is only accessible with the use of one of the set of security keys stored by the TEE. The encryption algorithm may be a symmetric encryption or an asymmetric encryption without departing from the invention. As a second example, the security operation may be locking access to the data in the storage device such that the access may be unlocked with a passcode (e.g., one of the set of security keys). This may be referred to as data-at-rest encryption.

After configuring the set of storage devices to obtain secured storage devices, the system control processor manager may orchestrate the access to the set of security keys by the tenant. For example, the tenant may send, via a LCS, requests to access data from the secured storage devices. The system control processor manager (or other entities) may perform any methods for verifying the identity of the LCS and its association to the tenant. The identity verification may be performed in accordance with, e.g., FIG. 7. Further, the system control processor manager may provide the LCS the security keys for unlocking (or otherwise decrypting) the storage devices (e.g., by providing secured access to the TEE).

While the method of FIG. 5 describes the generation of one TEE for one configuration request, the system control processor manager may include functionality for performing the method of FIG. 5 for multiple tenants and/or in response to multiple configuration requests by one tenant. In such embodiments, each generated TEE may be associated with one of the tenants that initiates a configuration request. Further, one or more TEEs may be generated for multiple configuration requests associated with one tenant. In this manner, the system control processor may manage the storage of keys for multiple tenants, yet each tenant does not utilize any TEEs that store the keys of other tenants.

Figure 6:
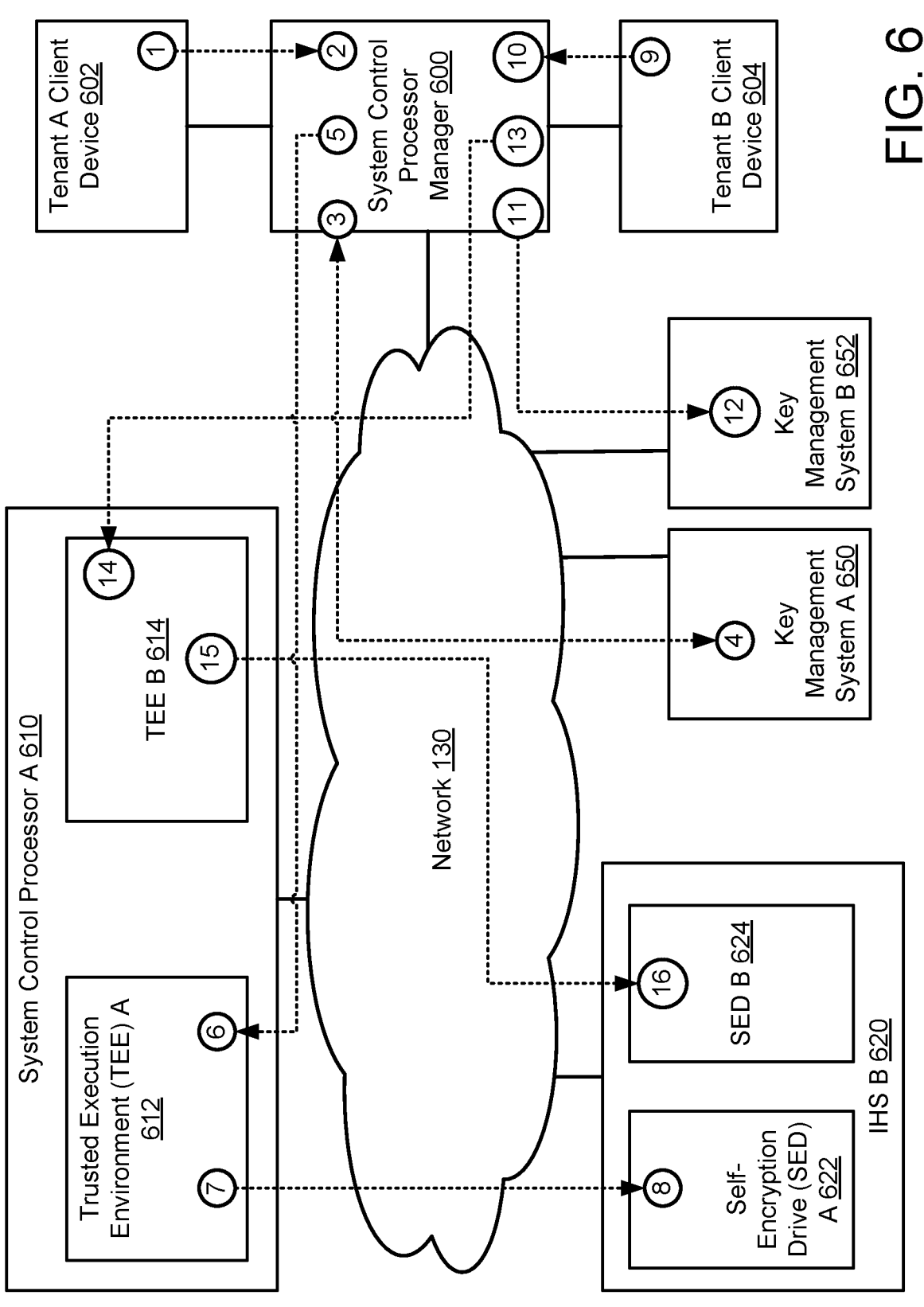
FIG. 6 shows a diagram of the operation of a first example system over time in accordance with one or more embodiments of the invention.

To further clarify aspects of the method as described above and in FIG. 5, a non-limiting example use case is provided below and in FIG. 6. FIG. 6 shows a system similar to that illustrated in FIG. 1.1. Actions performed by components of the illustrated system are illustrated by numbered, circular boxes interconnected, in part, using dashed lines. For the sake of brevity, only a limited number of components of the system of FIG. 1.1 is illustrated in FIG. 6.

Example 1

Consider a scenario as illustrated in FIG. 6 in which a client device of tenant A (602), at step 1, sends a configuration request to a system control processor manager (600) for the configuration of self-encryption drive A (SED A) (622) of IHS B (620). The configuration request specifies that SED A (622, 624) be protected using data-at-rest encryption. The data-at-rest encryption includes preventing access to data in the SEDs (622, 624) without the use of a passcode (e.g., a security key). At step 2, the system control processor manager (600) obtains the configuration request.

At step 3, the system control processor manager (600) initiates communication with a KMS (650) associated with tenant A by providing a secured channel to communicate with the KMS A (650). At step 4, KMS A (650) sends a set of keys that includes at least a first key for encrypting the SEDs (622, 624) and a passcode for unlocking an SED (622, 624) that has been locked using the first key. The set of keys are sent via the secured channel.

At step 5, the system control processor manager (600) generates trusted execution environment (TEE) A (612) in system control processor A (610) and sends the set of keys to be stored in TEE A (612). At step 6, TEE A (612) stores the set of keys in its secured memory (not shown).

At step 7, TEE A (612) configures SED A (622) using the stored set of keys. At step 8, the SEDs are locked to only be accessed by the passcode stored in TEE A. A client device of tenant A (e.g., 602) may unlock SED A (622) by accessing TEE A (612) via the system control processor (610) executing TEE A (612).

Similarly to steps 1-8, steps 9-16 may be performed for the service of a second configuration request initiated by a client device (604) of a second tenant (i.e., tenant B). Specifically, at step 9, tenant B client device (604) may send the second configuration request for configuring SED B (624) via data-at-rest encryption. At step 10, the system control processor manager (600) receives the second configuration request. At step 11, the system control processor manager (600) initiates communication with a second KMS (652) associated with tenant B by providing a second secured channel to communicate with the KMS B (652). At step 12, KMS B (652) sends, via the second secured channel, a second set of keys for configuring SED B (624).

At step 13, the system control processor manager (600) generates TEE B (614) in system control processor A (610) and sends the second set of keys to be stored in TEE B (614). At step 14, TEE B (614) stores the second set of keys in its secured memory (not shown).

At step 15, TEE B (614) configures SED B (624) using the second set of keys. At step 16, the SEDs are configured. A client device of tenant B (e.g., 604) may unlock SED B (624) by accessing TEE A (612) via the system control processor (610) executing TEE A (612).

In this example, two TEEs (612, 614), each associated with a different tenant, execute in the same system control processor (610). While the TEEs (612, 614) execute in a system control processor (610) that is different from the system control processor manager (600), the system control processor manager (600) includes functionality for executing the TEEs (612, 614) without departing from the invention.

End of Example 1

FIG. 7 shows a flowchart of a method in accordance with one or more embodiments of the invention. The method depicted in FIG. 7 may be performed to broker key management using a trusted execution environment in accordance with one or more embodiments of the invention. The method shown in FIG. 7 may be performed by, for example, a system control processor (e.g., 114, FIG. 1.2). Other components of the system in FIG. 1.1 and FIG. 1.2 may perform all, or a portion, of the method of FIG. 7 without departing from the invention.

While FIG. 7 is illustrated as a series of steps, any of the steps may be omitted, performed in a different order, additional steps may be included, and/or any or all of the steps may be performed in a parallel and/or partially overlapping manner without departing from the invention.

In step 700, a LCS verification request is obtained for verifying a LCS associated with a tenant for servicing a workload. In one or more embodiments, the LCS verification request (also referred to as a verification request) specifies a LCS identifier of the LCS, the tenant associated with the LCS, and/or any other information used for the identity verification of the LCS. Further, the LCS verification request is sent for the purposes of servicing a workload using the system control processor.

In step 702, the corresponding TEE of the LCS is identified based on the associated tenant of the LCS. In one or more embodiments, the tenant utilizes a TEE for the protection of sensitive information and/or for the verification of LCSs that request to utilize the services of the SCP for servicing workloads. The TEE may execute in the system control processor or in another entity (e.g., another system control processor). The TEE may be identified based on the specified tenant in the LCS verification request. As previously discussed, each TEE may be associated with a tenant.

In step 704, a challenge question is sent to the LCS for identity verification. In one or more embodiments, the challenge question is a question that is intended to only be answered by the tenant. The challenge question may be determined based on a stored bank of questions associated with the tenant.

In step 706, a security response is obtained from the LCS. In one or more embodiments, the security response includes an answer to the challenge question. The challenge answer may be encrypted with a public key that was previously shared with the LCS by the TEE (or by the system control processor) for the purpose of identity verification. The public key may be part of a public-private key pairing. In one or more embodiments, the LCS performs an encryption algorithm on the challenge answer using the public key and provides the encrypted answer as the security response.

In step 708, the identity of the LCS is verified using a LCS-key pairing stored in secured storage of the TEE. In one or more embodiments, the system control processor performs an identity verification on the LCS. In one or more embodiments, the identity verification includes identifying a private key using an entry of the LCS-key pairing. The LCS-key pairing includes a table of entries each pairing a LCS identifier to a private key to be used for identity verification. The private key discussed throughout FIG. 7 may be different from the set of keys discussed in FIG. 5. The identity verification may further include applying a function to the private key to obtain a first value, and comparing the first value to the obtained security response to determine a match. If the first value and the security response match, the LCS is deemed verified.

In one or more embodiments, if the LCS is not deemed verified from the identity verification, the system control processor may initiate other actions to confirm the identity of the LCS. Such other actions may include, for example, initiating communication with the tenant to obtain confirmation of the LCS. Other actions may be performed to verify the identity of the LCS without departing from the invention.

In one or more embodiments, if the LCS is unable to verify its identity, the method may end following step 708, and no workload is serviced for the LCS. If the identity verification results in the identity of the LCS being verified, the method may proceed to step 710.

In step 710, the workload associated with the LCS is serviced. In one or more embodiments, the workload is serviced by providing the resources to the LCS and performing the workload using the provided resources. In this manner, the instantiated LCS accesses the resources (e.g., data in storage) after the LCS has been verified by the system control processor.

To further clarify embodiments of the invention, a non-limiting example is provided in FIG. 8. FIG. 8 shows a system similar to that illustrated in FIG. 1.1. Actions performed by components of the illustrated system are illustrated by numbered, circular boxes interconnected, in part, using dashed lines. For the sake of brevity, only a limited number of components of the system of FIG. 1.1 is illustrated in FIG. 8.

Example 2

Consider a scenario as illustrated in FIG. 8 in which an application executing on behalf of a logically composed system (LCS) wishes to perform a workload. The LCS (i.e., LCS A) must verify its identity with a system control processor (810) to perform the workload. At step 1, the application for LCS A (822) sends a verification request to the system control processor (810) of an information handling system (IHS) (820). At step 2, the system control processor receives the verification request and identifies a TEE (812) associated with the tenant of LCS A. TEE A (812) includes a secured memory (816) that stores a LCS-key pairing of each LCS associated with the tenant. Further, the system control processor (810) executes a second TEE (TEE B (814)) that manages its own LCS-key pairing.

At step 3, the system control processor (810) sends a challenge question to the application (822) for identity verification. At step 4, the application (822) receives the challenge question and generates a challenge answer. At step 5, the challenge answer is encrypted using a public key (824) stored locally by the application (822) to obtain a security response. The security response is sent to the system control processor (810).

At step 6, the system control processor (810) obtains the security response and performs the identity verification of FIG. 7 to verify the identity of LCS A (822) and provide the resources for servicing the workload requested by LCS A. End of Example 2

Figure 9:
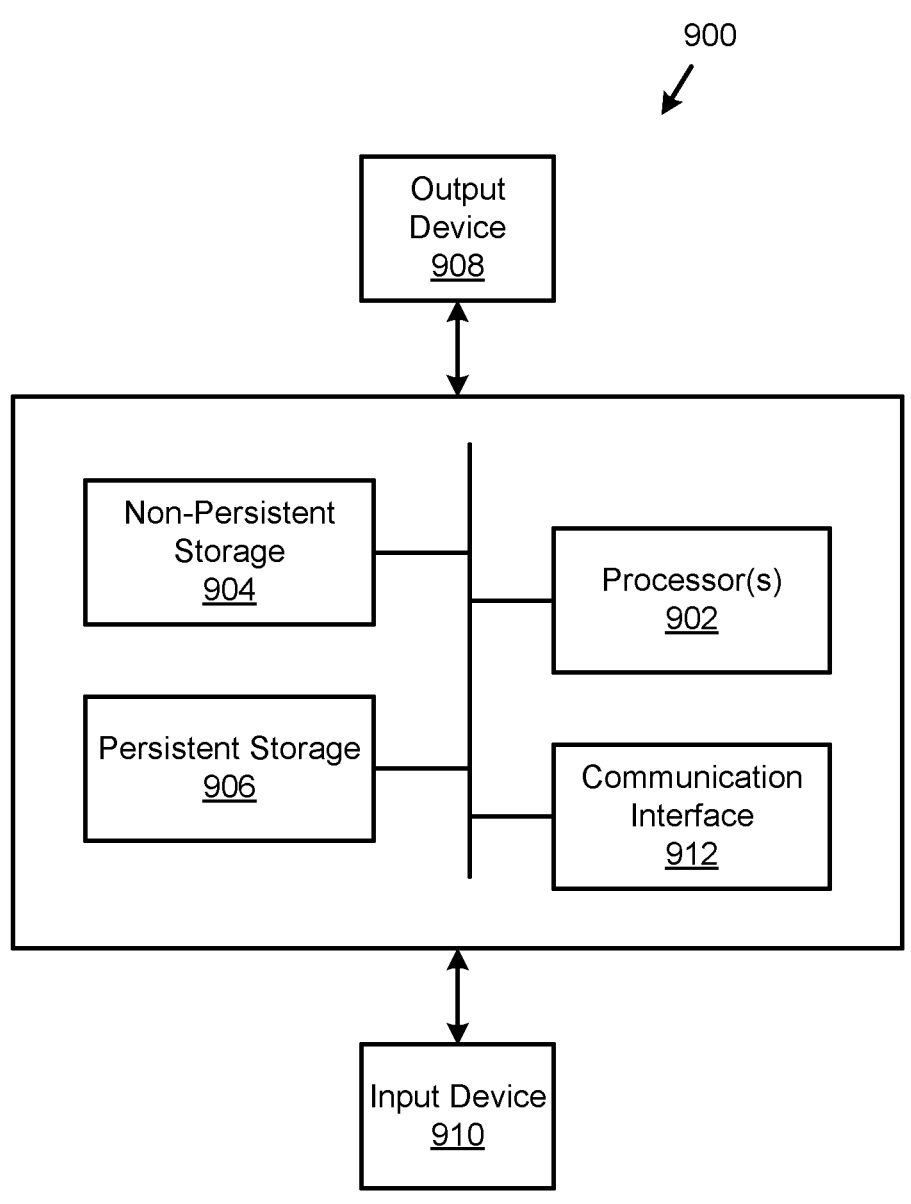
FIG. 9 shows a diagram of a computing device in accordance with one or more embodiments of the invention.

As discussed above, embodiments of the invention may be implemented using computing devices. FIG. 9 shows a diagram of a computing device in accordance with one or more embodiments of the invention. The computing device (900) may include one or more computer processors (902), non-persistent storage (904) (e.g., volatile memory, such as random access memory (RAM), cache memory), persistent storage (906) (e.g., a hard disk, an optical drive such as a compact disk (CD) drive or digital versatile disk (DVD) drive, a flash memory, etc.), a communication interface (912) (e.g., Bluetooth interface, infrared interface, network interface, optical interface, etc.), input devices (910), output devices (908), and numerous other elements (not shown) and functionalities. Each of these components is described below.

In one embodiment of the invention, the computer processor(s) (902) may be an integrated circuit for processing instructions. For example, the computer processor(s) may be one or more cores or micro-cores of a processor. The computing device (900) may also include one or more input devices (910), such as a touchscreen, keyboard, mouse, microphone, touchpad, electronic pen, or any other type of input device. Further, the communication interface (912) may include an integrated circuit for connecting the computing device (900) to a network (not shown) (e.g., a local area network (LAN), a wide area network (WAN) such as the Internet, mobile network, or any other type of network) and/or to another device, such as another computing device.

In one embodiment of the invention, the computing device (900) may include one or more output devices (908), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (902), non-persistent storage (904), and persistent storage (906). Many different types of computing devices exist, and the aforementioned input and output device(s) may take other forms.

Embodiments of the invention may provide a system and method for dynamically instantiated LCSs. Specifically, embodiments of the invention may provide a system control processor manager, which generates and initiates execution of trusted execution environments (TEEs) each associated with a tenant. By providing these TEEs, multiple tenants may utilize the same infrastructure without the worry of inadvertently sharing data with other tenants in the infrastructure. Further, the TEEs provide mechanisms for securing sensitive information such as passcodes, encryption/decryption keys, and/or other information without departing from the invention. The TEEs may execute in the system control processor manager or in other system control processors of other information handling systems.

Additionally, the system control processors of the information handling systems may use the TEEs to perform identity verification for the instantiated LCSs. By providing such services, the LCSs may quickly and securely utilize the services offered by the system control processors to perform workloads in accordance with the purposes of the LCSs.

Thus, embodiments of the invention may address the problem of resource allocation for composed systems. For example, by utilizing a system control processor manager, the limited resources of multiple information handling systems may be efficiently allocated to provide desired computer implemented services.

The problems discussed above should be understood as being examples of problems solved by embodiments of the invention of the invention and the invention should not be limited to solving the same/similar problems. The disclosed invention is broadly applicable to address a range of problems beyond those discussed herein.

One or more embodiments of the invention may be implemented using instructions executed by one or more processors of a computing device. Further, such instructions may correspond to computer readable instructions that are stored on one or more non-transitory computer readable mediums.

While the invention has been described above with respect to a limited number of embodiments, those skilled in the art, having the benefit of this disclosure, will appreciate that other embodiments can be devised which do not depart from the scope of the invention as of the invention. Accordingly, the scope of the invention should be limited only by the attached claims.

What is claimed is:

1. A method for data security management, comprising:
obtaining, by a system control processor manager, a first configuration request for a first trusted execution environment (TEE) associated with a first tenant,
    wherein the first TEE is to be used for configuration of a self-encryption device (SED) of a first logically composed system (LCS) initiated by the first tenant,
    wherein the SED is external to the first TEE and to the first LCS,
    wherein the SED is accessible to the first TEE via a network,
    wherein the first LCS is a logical device instantiated using hardware from a plurality of information handling systems accessible via the network and has exclusive use over the hardware,
    wherein the first configuration request is issued by the first tenant to service a workload by the first LCS,
    wherein the first LCS is independent from a second LCS associated with a second tenant, and
    wherein the second LCS is a second logical device instantiated using second hardware from a second plurality of information handling systems accessible via the network and has exclusive use over the second hardware;
in response to the first configuration request:
    communicating with a first key management system (KMS) to obtain a first key associated with the first tenant;
    generating the first TEE associated with the first tenant;
    storing the first key in the first TEE; and
    encrypting the SED with the first key;
obtaining a second configuration request for a second TEE associated with the second tenant;
in response to the second configuration request:
    communicating with a key management system (KMS) to obtain a second key associated with the second tenant;
    generating the second TEE associated with the second tenant;
    storing the second key in the second TEE; and
    configuring, using the second key, a secured storage device associated with the second tenant,
    wherein the first TEE and the second TEE operate within a system control processor.

2. The method of claim 1, wherein the first configuration request is obtained from a first client device of the first tenant, and wherein the second configuration request is obtained from a second client device of the second tenant.

3. The method of claim 1, wherein the system control processor operates in the system control processor manager.

4. The method of claim 1, wherein the system control processor operates in a system control processor operatively connected to the system control processor manager.

5. The method of claim 1, wherein configuring the secured storage device associated with the first tenant comprises:
accessing the first key from the first TEE; and
encrypting application data in the secured storage device using the first key.

6. The method of claim 1, wherein the first key is a security key of an asymmetric encryption algorithm.

7. A system control processor manager programmed to:

obtain a configuration request for a trusted execution environment (TEE) associated with a tenant, wherein the first TEE is to be used for configuration of a self-encryption device (SED) of a first logically composed system (LCS) initiated by the first tenant, wherein the SED is external to the first TEE and to the first LCS, and wherein the SED is accessible to the first TEE via a network wherein the first LCS is a logical device instantiated using hardware from a plurality of information handling systems accessible via the network and has exclusive use over the hardware, wherein the first configuration request is issued by the first tenant to service a workload by the first LCS, wherein the first LCS is independent from a second LCS associated with a second tenant, and wherein the second LCS is a second logical device instantiated using second hardware from a second plurality of information handling systems accessible via the network and has exclusive use over the second hardware;

in response to the configuration request:

generate the TEE associated with the tenant;

communicate with a key management system (KMS) to obtain a set of keys, comprising a first key, associated with the tenant;

store the set of keys in the TEE; and encrypt the SED with the first key.

8. The system control processor manager of claim 7, wherein the system control processor manager is further programmed to:

obtain a second configuration request for a second TEE associated with a second tenant;

in response to the second configuration request:

generate the second TEE associated with the second tenant;

communicate with a second key management system (KMS) to obtain a second set of keys associated with the tenant;

store the set of keys in the second TEE; and configure a second set of secured storage devices associated with the second tenant with the second set of keys, wherein the second set of secured storage devices are not associated with the tenant.

9. The system control processor manager of claim 8, wherein the TEE and the second TEE operate in a system control processor.

10. The system control processor manager of claim 8, wherein the configuration request is obtained from a client device of the tenant, and wherein the second configuration request is obtained from a second client device of the second tenant.

11. The system control processor manager of claim 7, wherein the TEE executes in the system control processor manager.

12. The system control processor manager of claim 7, wherein the TEE executes in a system control processor operatively connected to the system control processor manager.

13. The system control processor manager of claim 7, wherein configuring the set of secured storage devices comprises:

accessing a key of the set of keys from the TEE; and encrypting application data in the set of secured storage devices using the key.

14. The system control processor manager of claim 7, wherein the set of keys comprises a public key and a private key of an asymmetric encryption algorithm.

15. A non-transitory computer readable medium comprising computer readable program code, which when executed by a computer processor enables the computer processor to perform a method for data security management, comprising:

obtaining, by a system control processor manager, a first configuration request for a first trusted execution environment (TEE) associated with a first tenant, wherein the first TEE is to be used for configuration of a self-encryption device (SED) of a first logically composed system (LCS) initiated by the first tenant, wherein the SED is external to the first TEE and to the first LCS, wherein the SED is accessible to the first TEE via a network, wherein the first LCS is a logical device instantiated using hardware from a plurality of information handling systems accessible via the network and has exclusive use over the hardware, wherein the first configuration request is issued by the first tenant to service a workload by the first LCS, wherein the first LCS is independent from a second LCS associated with a second tenant, and wherein the second LCS is a second logical device instantiated using second hardware from a second plurality of information handling systems accessible via the network and has exclusive use over the second hardware;

in response to the first configuration request:

communicating with a first key management system (KMS) to obtain a first key associated with the first tenant;

generating the first TEE associated with the first tenant;

storing the first key in the first TEE; and encrypting the SED with the first key;

obtaining a second configuration request for a second TEE associated with a second tenant;

in response to the second configuration request:

communicating with a key management system (KMS) to obtain a second key associated with the second tenant;

generating the second TEE associated with the second tenant;

storing the second key in the second TEE; and configuring, using the second key, a secured storage device associated with the second tenant, wherein the first TEE and the second TEE operate within a system control processor.

16. The non-transitory computer readable medium of claim 15, wherein the first configuration request is obtained from a first client device of the first tenant, and wherein the second configuration request is obtained from a second client device of the second tenant.

17. The non-transitory computer readable medium of claim 15, wherein the system control processor operates in the system control processor manager.

18. The non-transitory computer readable medium of claim 15, wherein the system control processor operates in a system control processor operatively connected to the system control processor manager.

19. The non-transitory computer readable medium of claim 15, wherein configuring the secured storage device associated with the first tenant comprises:

accessing the first key from the first TEE; and encrypting application data in the secured storage device using the first key.

20. The non-transitory computer readable medium of claim 15, wherein the first key is a private key of a symmetric encryption algorithm.

* * * * *